US012118921B2

(12) United States Patent
Carlson et al.

(10) Patent No.: US 12,118,921 B2
(45) Date of Patent: Oct. 15, 2024

(54) DYNAMIC COMPENSATION FOR THERMALLY INDUCED LIGHT OUTPUT VARIATION IN ELECTRONIC DISPLAYS

(71) Applicant: Daktronics, Inc., Brookings, SD (US)

(72) Inventors: Shane Steven Carlson, Estelline, SD (US); Matthew Ray Mueller, Brookings, SD (US); William John Wermers, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 17/452,942

(22) Filed: Oct. 29, 2021

(65) Prior Publication Data

US 2022/0139303 A1 May 5, 2022

Related U.S. Application Data

(60) Provisional application No. 63/107,697, filed on Oct. 30, 2020.

(51) Int. Cl.
*G09G 3/32* (2016.01)

(52) U.S. Cl.
CPC ......... *G09G 3/32* (2013.01); *G09G 2300/026* (2013.01); *G09G 2320/0233* (2013.01); *G09G 2320/041* (2013.01); *G09G 2360/04* (2013.01)

(58) Field of Classification Search
CPC ............... G09G 3/32; G09G 2300/026; G09G 2320/0233; G09G 2320/041; G09G 2360/04
USPC .......................................................... 345/694
See application file for complete search history.

(56) References Cited

U.S. PATENT DOCUMENTS

| | | | | |
|---|---|---|---|---|
| 9,622,326 | B1 * | 4/2017 | Devyver | G09G 3/3406 |
| 10,642,083 | B1 | 5/2020 | Hwang et al. | |
| 2013/0321361 | A1 * | 12/2013 | Lynch | G09G 3/3225 345/204 |

(Continued)

FOREIGN PATENT DOCUMENTS

| | | |
|---|---|---|
| WO | 2020192924 | 10/2020 |
| WO | WO-2022094611 A1 | 5/2022 |

OTHER PUBLICATIONS

"International Application Serial No. PCT US2021 072136, International Search Report mailed Mar. 16, 2022", 4 pgs.

(Continued)

*Primary Examiner* — Amare Mengistu
*Assistant Examiner* — Gloryvid Figueroa-Gibson
(74) *Attorney, Agent, or Firm* — Schwegman Lundberg & Woessner, P.A.

(57) ABSTRACT

A method comprises producing or receiving information regarding content to be displayed on an array of pixels as a function of time, wherein the information includes a specified light output for each pixel in the array as a function of time, determining an expected change in light output intensity for each of one or more of the pixels as a function of time, wherein the expected change in light output intensity for each of the one or more of the pixels is dependent, at least in part, on the specified light output for at least a portion of the pixels in the array, and modifying an output of each of the one or more of the pixels as a function of time to compensate for at least a portion of the expected change in the light output intensity.

16 Claims, 10 Drawing Sheets

(56) References Cited

U.S. PATENT DOCUMENTS

2018/0082631 A1 * 3/2018 Chang .................. G09G 3/3225

OTHER PUBLICATIONS

"International Application Serial No. PCT US2021 072136, Written Opinion mailed Mar. 16, 2022", 9 pgs.
"International Application Serial No. PCT/US2021/072136, International Preliminary Report on Patentability mailed May 11, 2023", 11 pgs.
"Australian Application Serial No. 2021372291, First Examination Report mailed Mar. 5, 2024", 3 pgs.

* cited by examiner

DYNAMIC COMPENSATION FOR THERMALLY INDUCED LIGHT OUTPUT VARIATION IN ELECTRONIC DISPLAYS

CROSS-REFERENCE TO RELATED APPLICTIONS

This application claims the benefit of priority to U.S. Provisional Patent Application Ser. No. 63/107,697 entitled "DYNAMIC COMPENSATION FOR THERMALLY INDUCED LIGHT OUTPUT VARIATION IN ELECTRONIC DISPLAYS," filed Oct. 30, 2020, the disclosure of which is incorporated by reference herein in its entirety.

BACKGROUND

Displays comprising a plurality of light-emitting elements, also referred to as electronic displays, are often used for the display of information. The light-emitting elements used in the electronic displays generate heat, which increases the temperature of the light-emitting elements during operation of the electronic display. Increased temperature has been known to reduce the light intensity that the light-emitting elements are capable of emitting. If the heat is not spread uniformly across the display, then the change in intensity will occur non-uniformly across the display. For example, if the displayed content includes static images for relatively long periods of time or other slow-changing content, then it can cause a "ghosted" version of the content to appear on the display. In addition, the formation of hot spots within the display, which can occur where heat is generated or dissipated non-uniformly can also result in non-uniform reduction in light output that deleteriously affects overall image quality from the display.

SUMMARY

In an example, the present disclosure describes a method comprising the steps of producing or receiving information regarding content to be displayed on an array of pixels as a function of time, wherein the information includes a specified light output for each pixel in the array as a function of time, determining an expected change in light output intensity for each of one or more of the pixels as a function of time, wherein the expected change in light output intensity for each of the one or more of the pixels is dependent, at least in part, on the specified light output for at least a portion of the pixels in the array, and modifying an output of each of the one or more of the pixels as a function of time to compensate for at least a portion of the expected change in the light output intensity.

In another example, the present disclosure describes a method comprising the steps of producing or receiving information regarding content to be displayed on an array of pixels as a function of time, wherein the information includes a specified light output for each pixel in the array as a function of time, determining an expected temperature for each of one or more of the pixels as a function of time, wherein the expected temperature for each of the one or more of the pixels is dependent, at least in part, on the specified light output for at least a portion of the pixels in the array, determining an expected change in light output intensity for each of the one or more of the pixels as a function of time, wherein the expected change in light output intensity for a first of the one or more of the pixels is dependent, at least in part, on the expected temperature for the first of the one or more pixels, and modifying an output of each of the one or more of the pixels as a function of time to compensate for at least a portion of the expected change in the light output intensity.

In yet another example, the present disclosure describes a method comprising the steps of producing or receiving information regarding content to be displayed on an array of pixels as a function of time, wherein the information includes a specified light output for each pixel in the array as a function of time, determining an expected heat generated from each of one or more of the pixels as a function of time, wherein the expected heat generated for a first of the one or more of the pixels is dependent, at least in part, on the specified light output for the first of the one or more of the pixels, determining an expected temperature for each of the one or more of the pixels as a function of time, wherein the expected temperature for a first of the one or more of the pixels is dependent, at least in part, on the expected heat generated by the first of the one or more of the pixels, determining an expected change in light output intensity for each of the one or more of the pixels as a function of time, wherein the expected change in light output intensity for the first of the one or more of the pixels is dependent, at least in part, on the expected temperature for the first of the one or more of the pixels, and modifying an output of each of the one or more of the pixels as a function of time to compensate for at least a portion of the expected change in the light output intensity.

BRIEF DESCRIPTION OF THE DRAWINGS

The drawings illustrate generally, by way of example, but not by way of limitation, various embodiments discussed in the present document.

DETAILED DESCRIPTION

Figure 1:
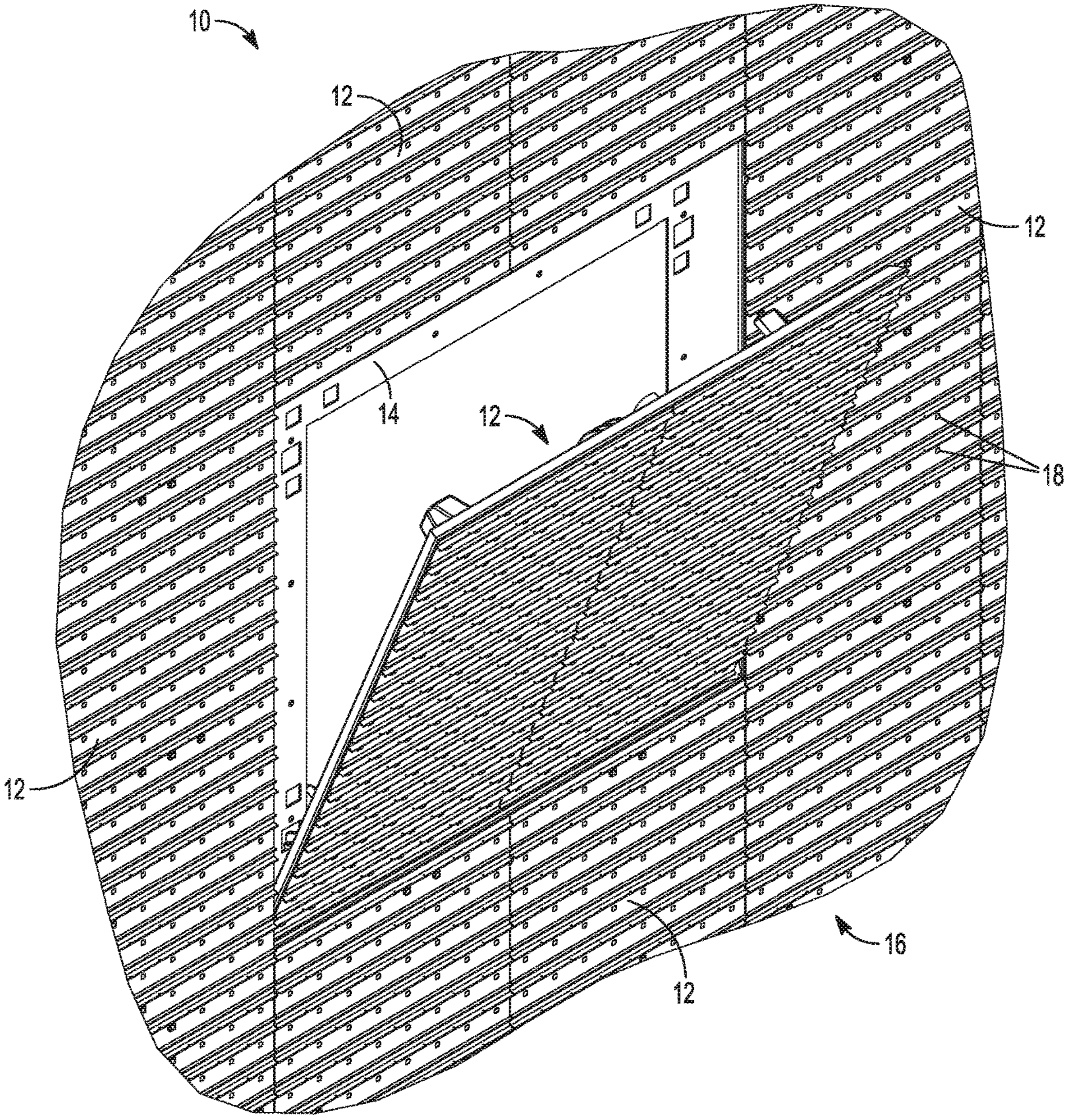
FIG. 1 is a partial perspective view of an example display comprising a plurality of individual display modules that are operated in a cooperative manner to display information on the light-emitting display.

The present disclosure describes systems and methods for compensating for thermally induced variation in light output intensity from the light-emitting elements in an electronic display, such as those used for electronic road signs, electronic advertising billboards, electronic video boards, or electronic scoreboards. As an electronic display is operated, the light-emitting elements generate heat, which tends to increase the temperature of structures proximate to the light-emitting element or elements. As temperature increases, it is common for the light intensity from a light-emitting element to decrease in a predictable way as a function of the temperature. But, because different areas of the display may be operated at different intensities and for different durations because of the dynamic nature of the content being displayed (which can take the form of video, graphical, or textual information), the temperature of the display changes non-uniformly. A larger temperature change tends to occur for portions of the display that remain static for longer periods of time. Non-uniform temperature, in turn, results in a non-uniform change in light output intensity, with the areas of the display with higher temperatures experiencing greater light-output reduction than their lower-temperature counterparts. The non-uniform light output reduction can lead to "content ghosting" or "watermarking," where one or more regions of the display in the shape of a portion of a previous image can be distorted with a change in color or intensity (or both) from what is intended to be displayed. This thermally induced distortion can remain until the heat from the higher-temperature region or regions dissipates and temperatures across the display more uniformly equalize.

Modern electronic displays are being operated with higher and higher intensity as electronic display customers demand brighter and higher-contrast displays. In addition, technology is evolving such that the light-emitting elements themselves can tend to generate more heat. As will be appreciated by those having skill in the art, each of these factors the market-driven push to operate electronic displays at higher and higher intensity, ever-increasing resolution, and advances in light-emitting element technology) has resulted in more heat being generated in a smaller relative area, which has tended to exacerbate problems with thermally induced decreases in light output intensity and the image ghosting that results therefrom.

The systems and methods described in the present disclosure provides a solution to this problem of thermally induced output intensity reduction. In particular, the systems and methods of the present disclosure involve digitally compensating for thermally induced changes in light output intensity based on the specific content being submitted to the display. The compensation for the thermally induced output change not only provides a means of reducing or eliminating distortions due to non-uniform thermal effects, but it also allows the display to be operated at an overall brighter intensity because the thermal gradients that result therefrom are accounted for. Also, the digital compensation of the present disclosure can allow for reduced cost and complexity for the display because there is less need to design for enhanced heat dissipation in the form of heat sinks, coolers, enhanced ventilation, or other means of uniformly dissipating heat across the display.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G; F and G; D, E, and F; D, E, and G; D, F, and G; E, F, and G; or D, E, F, and G." A comma can be used as a delimiter or digit group separator to the left or right of a decimal mark; for example, "0.000, 1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Electronic Information Displays

FIG. 1 is a perspective view of an example electronic information display 10 (also referred to simply as "the display 10") that can include the dynamic thermal compensation described herein. The display 10 is configured to display one or more of video, graphical, or textual information. The display 10 includes one or more individual display modules 12 mounted to one or more supports, such as a support chassis 14. In examples wherein the display 10 is formed from a plurality of the display modules 12, the plurality of display modules 12 operate together so that the overall display 10 appears as a single, larger display. FIG. 1 shows one of the display modules 12 being in a pivoted or tilted position relative to the support chassis 14, which can occur when that display module 12 is in the process of being mounted to or dismounted from the support chassis 14 while the other display modules 12 in the display 10 have already been mounted to the support chassis 14. The display 10 can include a display surface 16 configured to display the video, graphical, or textual information from the display 10. A plurality of light-emitting elements 18 is mounted to the display surface 16. For example, light-emitting elements 18 can be mounted to one or more module support structures on each of the display modules 12, such as one or more of a circuit board, potting, or a module frame of a corresponding display module 12. The light-emitting elements 18 are operated together to display the video, graphical, or textual information on the display 10.

The light-emitting elements 18 can be any type of light-emitting technology known or yet to be discovered for the emission of light from a small area (e.g., from a pixel area), particularly for light-emitting technology that is or can be used to display visual information, such as video, graphical, or textual information. At the time of filing of the present application, light-emitting diodes (LEDs) are one of the most common light-emitting technologies in use for video or graphical displays of the type described herein. In particular, surface-mounted LEDs are becoming the standard light-emitting technology for use in an electronic display. As such, for the sake of brevity, the remainder of the present disclosure will refer to light-emitting elements that can be used in a display (including the light-emitting elements 18 shown in FIGS. 1 and 2) as LEDs. Those of skill in the art will appreciate, however, that any time the present disclosure uses the term "light-emitting diode" or "LED," that light-emitting devices other than LEDs can be used. Rather, the heat-induced light intensity reduction.

Figure 2:
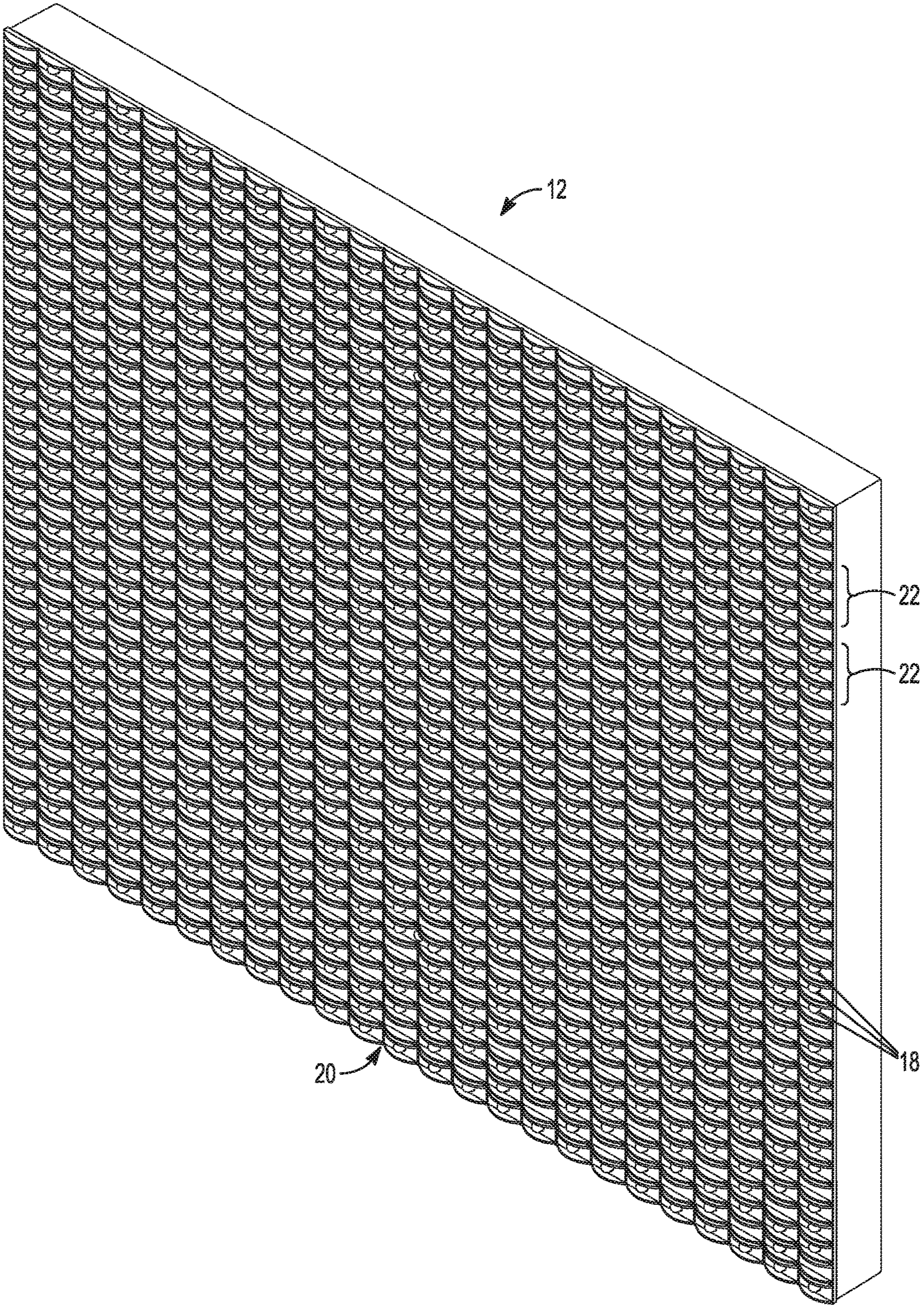
FIG. 2 is a perspective view of an example display module, which can be used as one of the individual display modules in the example display of FIG. 1.

FIG. 2 is a perspective view of an example display module 12 that can be used in the display 10 of FIG. 1. The display module 12 includes a front face 20 configured to provide for a display of graphics or video content. A plurality of the LEDs 18 is mounted to the front face 20 by being mounted onto a module support structure, such as an electronics circuit board or a module frame. The LEDs 18 can be operated in such a way that the display module 12 will display a portion of the video, graphical, or textual information to be shown on the display 10. The front face 20 of the display module 12 is aligned and oriented relative to the front faces 20 of one or more adjacently-positioned display modules 12 so that the front faces 20 combine and cooperatively form the overall display surface 16 of the full display 10 (shown in FIG. 1). The plurality of display modules 12 are operated together in such a way as to display the video, graphical, or textual information in a cohesive manner so that the entire display 10 appears to a viewer as a single display that is larger than the individual display modules 12.

In an example, the LEDs 18 are arranged into an array of pixels 22, as shown in FIG. 2). Each pixel 22 includes one or more LEDs 18 grouped together in close proximity. The proximity of the pixels 22 allows the display 10 to be operated in such a way that they will appear to a viewer of the display 10 to form recognizable shapes, such as letters or numbers to display textual information or recognizable shapes to display graphical or video information. In some examples, the plurality of LEDs 18 includes a plurality of different-colored LEDs 18 such that different-colored LEDs 18 of each pixel 22 can be cooperatively operated to display what appears to be a spectrum of different colors for the viewer of the display 10. In an example, each pixel 22 includes three or more differently colored LEDs. A common combination of LEDs that is used to form a color electronic display is the so-called "RGB" configuration, with each pixel 22 including at least one red LED, at least one green LED, and at least one blue LED, wherein the red, green, and blue LEDs of each pixel 22 cooperate to provide essentially the entire color spectrum that is visible to humans based on whether one, two, or all three of the LED colors in a pixel 22 are lit, and at what intensities. The display 10 can also provide a black or empty looking surface over a portion of the display, when desired, by deactivating or turning off the LEDs in a designated area of pixels 22.

In some examples, the LEDs 18 of each pixel 22 can be arranged in a specified shape that is repeated for all of the pixels 22 in the array. In the example shown in FIG. 2, each pixel 22 includes a plurality of LEDs 18 arranged in a linear or substantially linear pixel shape comprising three LEDs 18 (e.g., which could be the red, green, and blue colored LEDs 18, as discussed above) that are aligned or substantially aligned in a common line, such as in the vertically aligned pixel shape shown in FIG. 2. Those of skill in the art will appreciate that pixel shapes other than a vertical or substantially vertical pixel 22 can be used, including, but not limited to: a linear or substantially linear pixel oriented in a direction other than vertical (e.g., a horizontal or substantially horizontal pixel shape or a diagonal linear pixel shape). As is described in more detail with respect to FIG. 3, the LEDs of the pixels can be arranged into geometrical pixel shapes with one or more LEDs at each vertex of a specified geometrical shape, such as triangular pixels formed from three or more LEDs positioned at least at the vertices of a triangle, quadrilateral pixels formed from four or more LEDs positioned at least at the vertices of a quadrilateral, a pentagonal pixel formed from five or more LEDs positioned at least at the vertices of a pentagon, and so on.

In an example, the pixels 22 are arranged in an array with a specified pattern such as a grid-like array having a specified number of pixel rows and a specified number of pixel columns. The display 10 can be controlled, for example with control software and/or one or more hardware controllers, so that visual information, e.g., video, graphical, or textual information, is broken down into coordinates. Each coordinate can correspond to a specific pixel location within the overall display 10, such as a specific row and a specific column, and the control software and/or the one or more hardware controllers can operate each pixel 22 according to a program that specifies a condition for each coordinate within the display 10 and controls each of the pixels 22 so that it will appear to emit light that meets the condition specified. For example, if the display 10 is displaying a series of textual messages, the control software and/or the one or more hardware controllers can be fed the data corresponding to the series of textual messages, and the control software and/or the one or more hardware controllers can break the text of the messages down into conditions for each pixel 22, such as the time within the series of messages, whether the particular pixel 22 is to be lit at that time, the color that the pixel 22 is to display at that time (if the display 10 is a multi-colored display), and the intensity of the pixel 22 at that time. The control software and/or the one or more hardware controllers can also convert the information regarding color and intensity into specific operating parameters for each LED 18 in a particular pixel 22, such as the drive current that will be supplied to each of the red, green, and blue LEDs 18 in that pixel 22 and for how long in order to achieve the specified color and intensity at the specified time. The control software and/or the one or more hardware controllers can then send control signals to the pixels 22 or to individual LEDs 18 that can operate the pixels 22 according to the specified series of textual messages. Although a grid or grid-like array of LED pixels 22, as summarized above, is common, the display 10 described herein can use other arrangements of the LEDs or other systems for addressing the LEDs can be used without varying from the scope of the present invention.

Although FIGS. 1 and 2 show an example display with a plurality of display modules, the dynamic thermal compensation of the present disclosure is not limited to use with a modular display. Rather, those having skill in the art will appreciate that other display configurations can be used without varying from the scope of the present invention.

Figure 3:
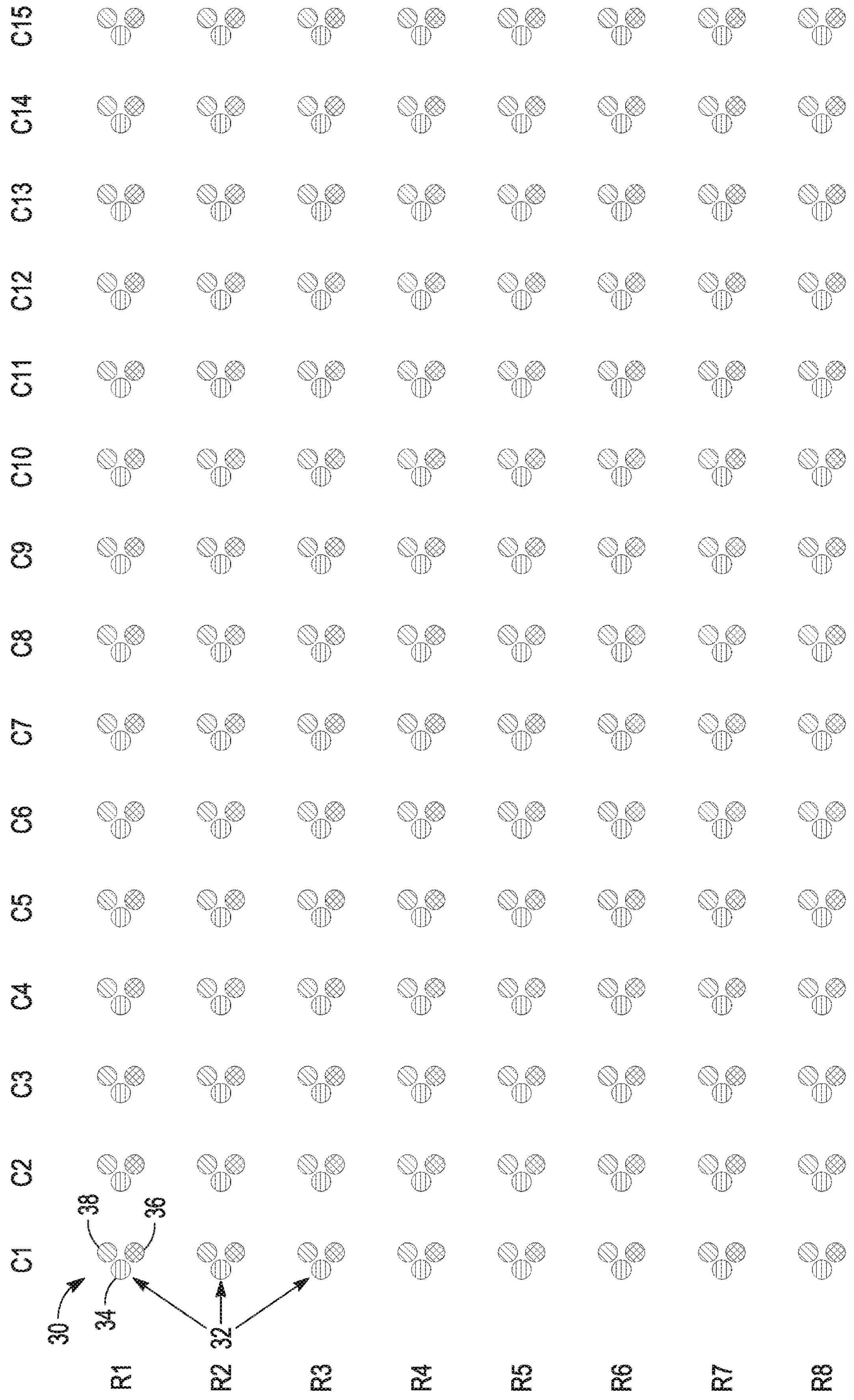
FIG. 3 is a front view of an example electronic display comprising an array of a plurality of light-emitting element pixels.

FIG. 3 shows a front view of an example array 30 of pixels 32. The pixels 32 in the array 30 are an RGB-type display, that is they include three LEDs in each pixel 32, one for each of three primary light colors, i.e., a red LED 34, a green LED 36, and a blue LED 38. The physical configuration of the pixels 32 in FIG. 3 is shown as a generally triangular configuration, e.g., with each LED 34, 36, 38 being positioned at the vertex of a triangle. Those having skill in the art will appreciate that displays according to the present disclosure are not limited to RGB-type displays, to those with three LEDs per pixel, to those with triangular pixels , or to any other configuration, and that other specific layouts of the LEDs 34, 36, 38 in the pixels can be used including, but not limited to, a linear pixel (e.g., with the LEDs 34, 36, 38 arranged generally or substantially along the same line, which can be vertical or substantially vertical as in the example of FIG. 2, horizontal or substantially horizontal, or diagonal), a non-equilateral triangle, or a non-regular geometric shape.

The pixels 32 in FIG. 3 are arranged in a grid-like array 30, such as a grid including a specified number of pixel rows R1, R2, R3, R4, R5, R6, R7, and R8 (hereinafter generically referred to as "row R" and collectively referred to as "rows R") and a specified number of pixel columns C1, C2, C3, C4, C5, C6, C7, C8, C9, C10, C11, C12, C13, C14, and C15 (hereinafter generically referred to as "column C" and collectively referred to as "columns C"). A particular pixel 32 can be addressed by identifying the specific row and column where the pixel is located. For example, the pixel 32 in the top left corner of the array 30, as depicted in FIG. 3, is located at row R1 and column C1, or "(R1, C1)" for simplicity, while the pixel 32 four rows below and six (6) columns to the right of that pixel is located at row R5 and column C7 (R5, C7).

Thermally Induced Change in Light Intensity

Figure 4:
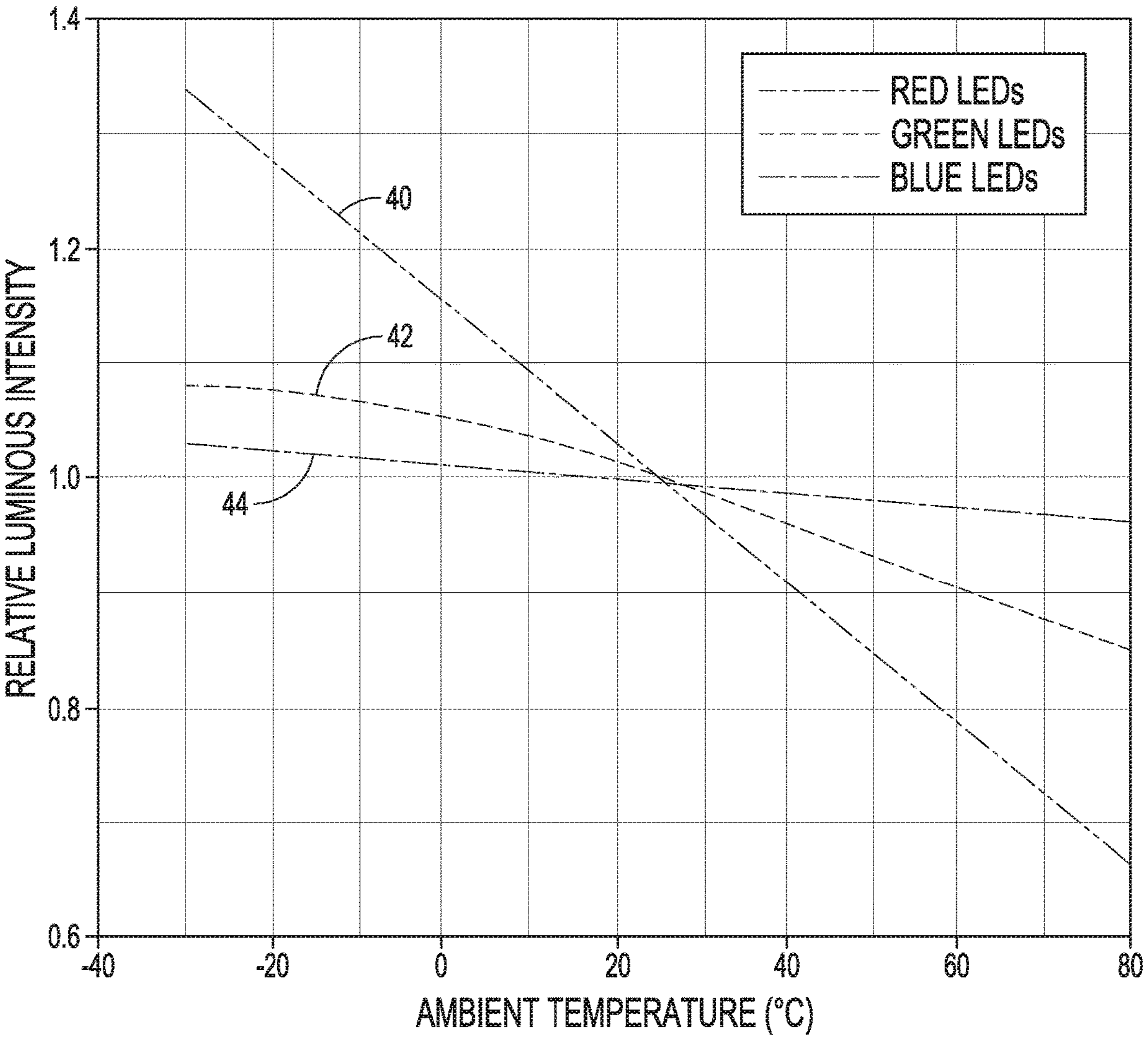
FIG. 4 is a graph showing an example relationship between temperature and relatively luminous activity for red LEDs, green LEDs, and blue LEDs, such as in the example array of pixels shown in FIG. 3.

As mentioned above, the light output intensity by the LEDs 34, 36, 38 is affected by the temperature at the location of the LED 34, 36, 38. in most cases, the intensity output that a particular LED 34, 36, 38 is able to produce is inversely related to its temperature. In the case of many LEDs, the relationship between the temperature and the LED's maximum intensity output is linear or very nearly linear and is inversely related to temperature. FIG. 4 shows a graph of the relative luminous intensity of one specific example red LED (depicted by data line 40), green LED (data line 42), and blue LED (data line 44) over a range of temperatures, As can be seen by FIG. 4, all three colors of LEDs are inversely affected by rising temperature and all three colors are either linearly or nearly exactly linearly affected, as is the case with the red LEDs (data line 40) and, to a lesser extent, the blue LEDs (data line 44) or are nearly linearly affected, as is the case with the green LEDs (data line 42), which have a slight higher rate of change when the temperature is above 20° C. compared to when the temperature is below 20° C., As can also be seen in FIG. 4, the exact relation between the temperature and the change in maximum intensity output can depend on the color of the LED in question. For example, with the LEDs for which the data in FIG. 4 applies, the red LEDs are affected substantially more by changes in temperature than green LEDs and blue LEDs (as can be seen by the substantially steeper slope for the data line 40, corresponding to the red LEDs, compared to the data lines 42 and 44, corresponding to the green and blue LEDs).

As discussed above, the decrease in light output as the temperature increases can be problematic because electronic components, such as the LEDs 34, 36, 38 in the array 30 and any supporting electronics that drive the LEDs 34, 36, 38, tend to heat up as they are operated. This can be particularly true for LEDs in an array when the information being display is a static image or slowly changing video where the same area or areas of the array 30 are lit for a relatively long period of time. In addition, since information displayed on the array 30 typically causes the LEDs 34, 36, 38 to be non-uniformly lit (meaning that some pixels 32 are lit while other pixels 32 are not, or that some pixels 32 are lit at a higher intensity than others), it can result in non-uniform temperature gradients across the array 30, which in turn can non-uniformly reduce the output of only a portion of the pixels 32 and distort the overall image or video that is being displayed thereon.

One type of distortion that commonly occurs because of this non-uniform heating and the resulting non-uniform change in output intensity is a phenomenon often referred to as "content ghosting" or "watermarking," which is where the outline of a previously-displayed image appears after the image has changed. FIGS. 5-8 depict a simplified scenario where content ghosting occurs. Those having skill in the art will appreciate that the examples described with respect to FIGS. 5-8 are intended to show the factors that may be taken into consideration when implementing the dynamic light-output compensation of the present disclosure, and that the specific details described with respect to FIGS. 5-8 cannot be taken as limiting for the invention as a whole. Moreover, those having skill in the art will be able to readily extrapolate the situation described with respect to FIGS. 5-8 to many other situations involving different content to be displayed and to different sizes and shapes of displays compared to the array 30 described with respect to FIGS. 5-8.

Figure 5:
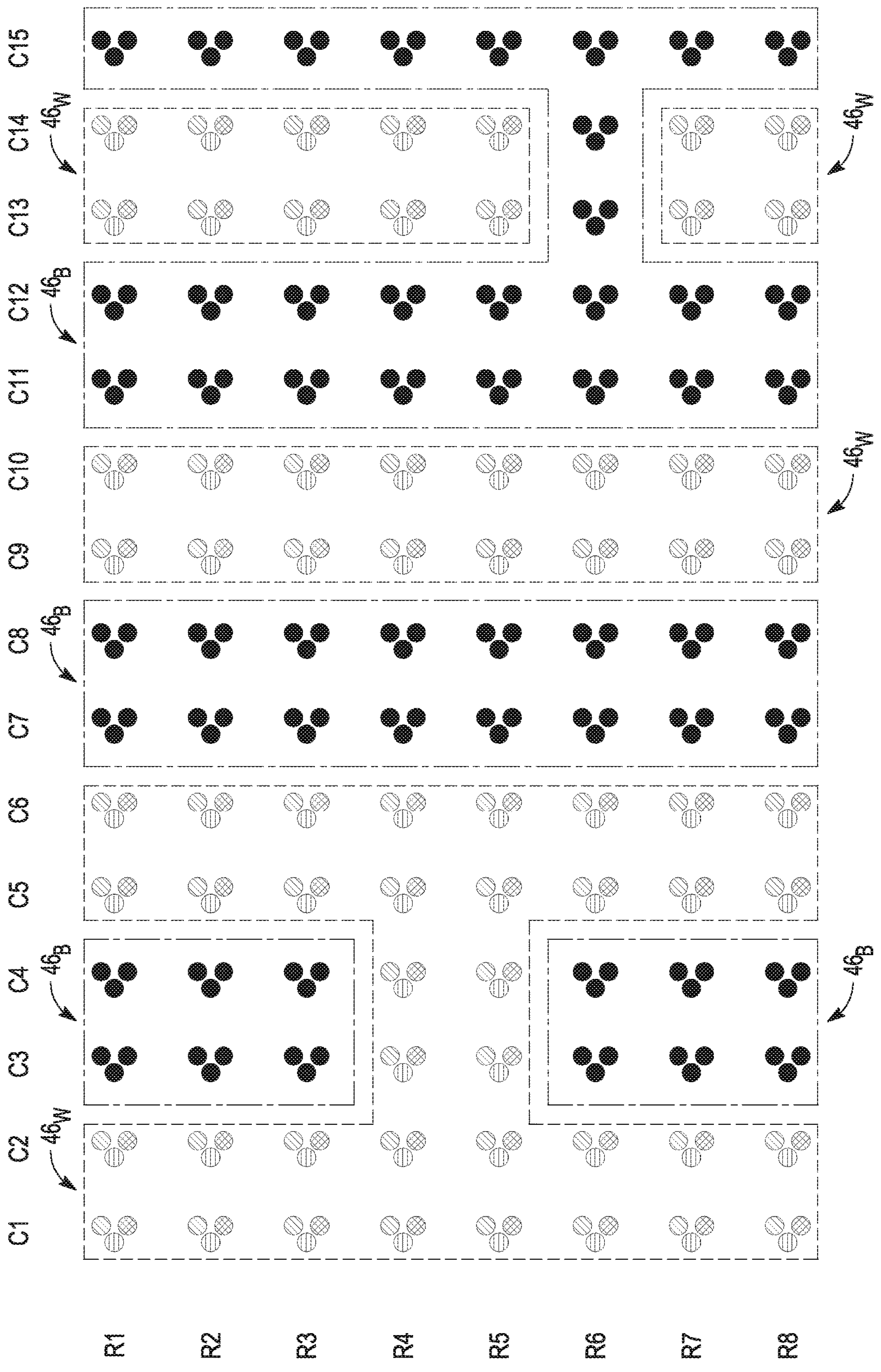
FIG. 5 is a first example of content comprising a textual message that can be displayed on the example array of FIG. 3.

FIG. 5 shows the array 30 lit in a specified way so that the array 30 displays a basic textual image, in this case the exclamation "HI!" In the example shown in FIG. 5, the text of the image (i.e., the "H", the "I", and the "!") is white text on a black background. As will be understood by those having skill in the art, the array 30 of pixels 32 can be configured to display an image, such as the textual image in FIG. 5, by breaking the array 30 down into one or more specified groupings 46 of pixels 32 (also referred to hereinafter as "pixel groupings 46" or simply "groupings 46"), with each grouping 46 corresponding to a set of pixels 32 being operated with the same conditions (e.g., emitting the same color at the same intensity) at the same time. For example, the white text of the image being displayed in FIG. 5 is formed by designating white pixel groupings $\mathbf{46}_W$ (e.g., a first grouping $\mathbf{46}_W$ for the letter "H", a second grouping $\mathbf{46}_W$ for the letter "I", a third grouping $\mathbf{46}_W$ for the top line of the exclamation point, and a fourth grouping $\mathbf{46}_W$ for the full stop point or period of the exclamation point) and lighting the pixels 32 of those pixel grouping $\mathbf{46}_W$ so that they will emit white light, i.e., by lighting all three of the red LED 34, the green LED 36, and the blue LEDs 38 at the same intensity so that the red, green, and blue wavelengths combine and are perceived as white light by the human eye. Similarly, the black background around the text is formed by designating black pixel groupings $\mathbf{46}_B$ (e.g., a first grouping $\mathbf{46}_B$ between the top portions of the stems of the "H", a second grouping $\mathbf{46}_B$ between the bottom portions of the stems of the "H", a third grouping $\mathbf{46}_B$ in the space between the "H" and the "I", and a fourth grouping $\mathbf{46}_B$ that fills in the space between the "I" and the exclamation point, between the top line and the full stop point of the exclamation point, and to the right of the exclamation point) and turning off all three LEDs 34, 36, 38 of the pixels 32 in those groupings 46B, which results in the appearance of the color black.

Because the white of the text is achieved by lighting all three LEDs 34, 36, 38 for each pixel 32 in the white pixel groupings $\mathbf{46}_W$, the area of the array 30 associated with the white pixel groupings $\mathbf{46}_W$ will tend to heat up at the highest rate and those portions of the array 30 will reach a high temperature and would have the correspondingly largest reduction in light output. Conversely, since the black background is achieved by keeping all three LEDs 34, 36, 38 off for each pixel 32 in the black pixel groupings $\mathbf{46}_B$, the area of the array 30 associated with the black pixel groupings 46 will tend to be the coolest possible, with little to no light output reduction, with some heating and corresponding output reduction at the periphery of the black pixel groupings 46B due to conductive heat transfer from the white pixel groupings $\mathbf{46}_W$.

Figure 6:
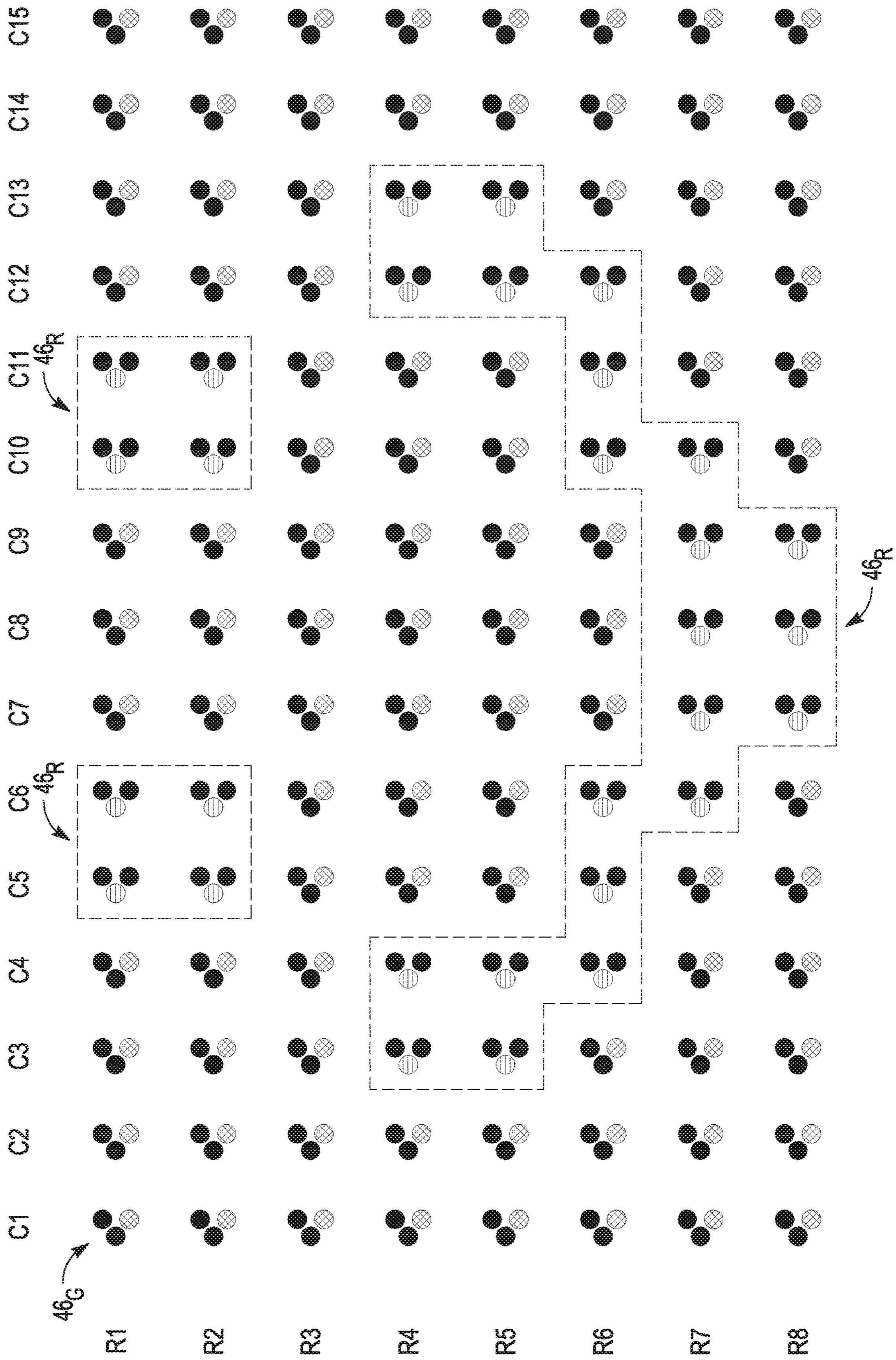
FIG. 6 is a second example of content comprising a visual image that can be displayed on the example array of FIG. 3.

FIG. 6 shows the same array 30 as in FIG. 5, but now lit so that the array 30 displays a basic visual image, in this case a rudimentary smiley face. In the example shown in FIG. 6, the portion of the image that makes up the features of the smiley face (e.g., the two "eyes" and the "mouth") are lit red (i.e., with only the red LED 34 for each pixel 32 being lit), while the field around the smiley face is lit green (e.g., with only the green LED 36 for each pixel 32 being lit). As with the textual message shown in the example of FIG. 5, the smiley face can be formed by breaking the array 30 down into pixel groupings 46 of pixels 32 having the same condition—in the case of the example image of FIG. 6, the array 30 can be broken down into red pixel groupings $\mathbf{46}_R$ (with one grouping $\mathbf{46}_R$ for each "eye" of the smiley face and another grouping $\mathbf{46}_R$ for the "mouth") wherein the pixels 32 of the red pixel groupings $\mathbf{46}_R$ are lit so that they will emit red light at a first specified intensity (i.e., by lighting only the red LEDs 34 at the specified intensity for the pixels 32 in the red pixel groupings 46R), and one or more green pixel groupings $\mathbf{46}_G$ (e.g., the remainder of the array 30 that is not taken up by the red pixel groupings $\mathbf{46}_R$ for the "eyes" and the "mouth") wherein the pixels 32 of the green pixel grouping $\mathbf{46}_G$ are lit so that they will emit green light at a second specified intensity (i.e., by lighting only the green LEDs 36 at the specified intensity for the pixels 32 in the green pixel groupings $\mathbf{46}_G$).

Figure 7:
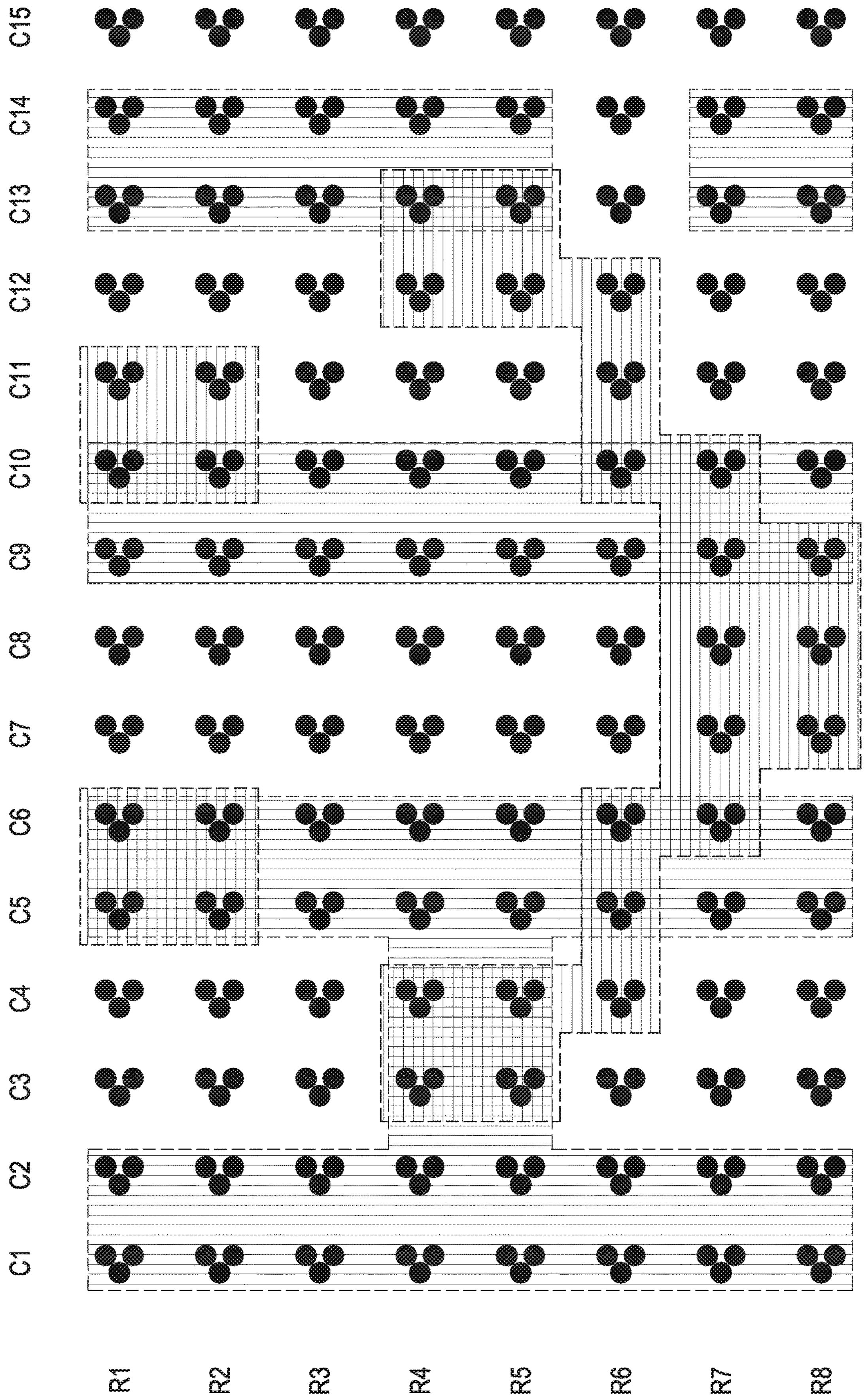
FIG. 7 is a representation of the example array of FIG. 3 shown with the textual message content of FIG. 5 overlaying the visual image content of FIG. 6.

FIG. 7 is a conceptual depiction where both the textual message "HI!" from FIG. 5 and the smiley face from FIG. 6 are shown overlaying one another, and without the individual LEDs 34, 36, 38 being shown as lit, In FIG. 7, the pixel groupings 46 that make up the main positive space in FIG. 5 (i.e., the letter "H", the letter "I", and the exclamation point "!") and FIG. 6 (i.e., the two "eyes" and the "mouth") are also show filled in with cross-hatching, with a first type of cross-hatching being used for the white pixel groupings $\mathbf{46}_W$ and with a second type of cross-hatching being used for the red pixel groupings $\mathbf{46}_R$ so that the areas of overlap between the positive space of the two designs can more easily be seen.

Figure 8:
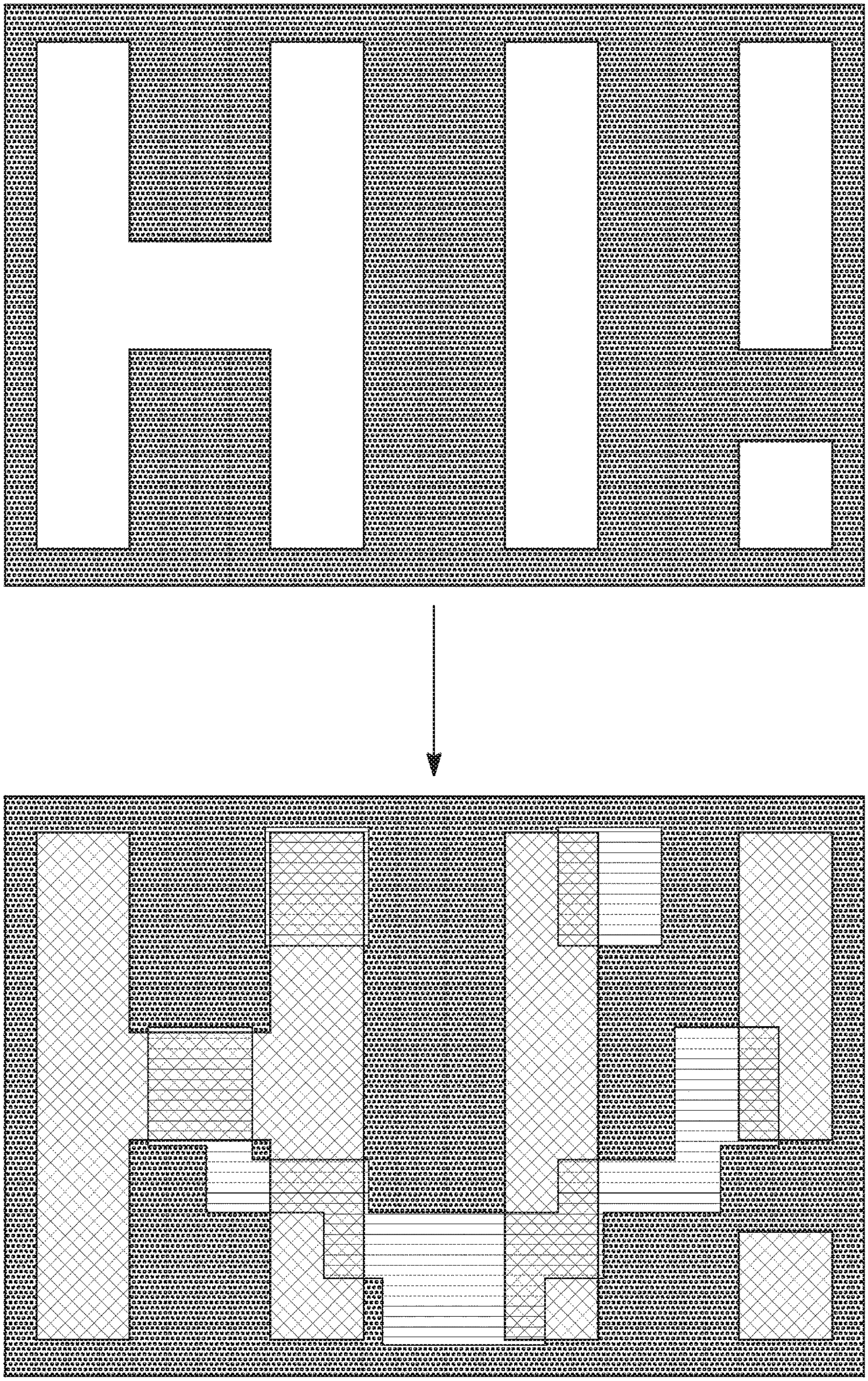
FIG. 8 is a conceptual illustration of content ghosting that could occur in an example where the array of FIG. 3 first displayed the textual message content of FIG. 5 followed by the visual image content of FIG. 6.

If, in an example, a sequence of content was designed where the "HI!" of FIG. 5 was shown first and remained on the array 30 as a static image for a relatively long period of time, followed immediately by the smiley face of FIG. 6, it would be expected that the heating of the white pixel groupings $46_W$ due to all three LEDs 34, 36, 38 being lit for the pixels 32 in the white pixel groupings $46_W$ (as described above) would result in a reduction in light output from at least the pixels 32 associated with the white pixel groupings $46_W$ for a period of time after the textual message of FIG. 5 was displayed. FIG. 8 shows a conceptual depiction of this scenario, where first the text image comprising the white "HI!" on the black background is shown, followed by the red smiley face on the green background. However, because of the light output reduction described above with respect to FIG. 4, the pixels 32 that had been associated with the white pixel groupings $46_W$ are unable to produce the same intensity, which results in portions of both the red pixel groupings $46_R$ and the green pixel groupings $46_G$ having diminished color intensity, such as a less vibrant red and green compared to what was specified by the content for the smiley face. This results in the image of the smiley face being distorted compared to the specific content that was specified. Not only that, but the outline of the previous image (i.e., the textual message "HI!") is visually apparent. The difference in light output and the color difference that results from the non-uniform heating caused by the textual message of FIG. 5 (i.e., "HI!"), followed by the visual image of FIG. 6 (i.e., the smiley face) is exaggerated to be more dramatic and discrete in FIG. 8 than what might actually be visually apparent to viewers of the array 30. Those having skill in the art will appreciate that what is shown in FIG. 8 is merely a conceptual illustration of how content ghosting can occur.

Dynamic Compensation for Therally Induced Changes in Light Intensity

The present disclosure describes systems and methods for digitally and dynamically compensating for changes in light output for individual pixels in a display based on temperature changes for the local area at or around each pixel. In particular, the systems and methods of the present disclosure are able to compensate for light output reduction due to non-uniform heating caused by lighting the light-emitting elements in order to display the specified content. The systems and methods described herein are able to provide for this compensation on a pixel-by-pixel basis (also referred to hereinafter as "pixel-by-pixel level thermal-based light output compensation," "pixel level thermal-based light output compensation" or simply "pixel-by-pixel compensation" or "pixel-level compensation").

Figure 9:
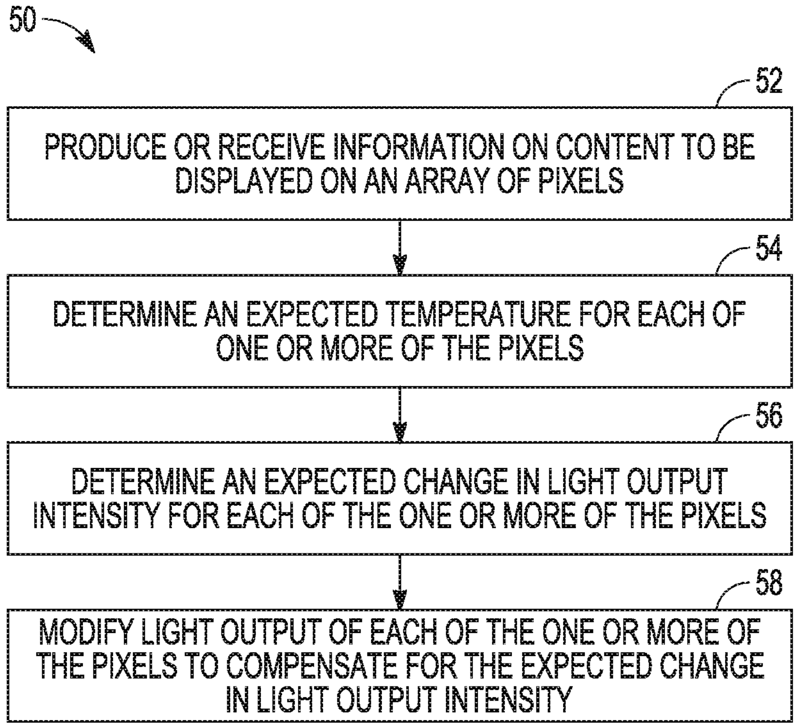
FIG. 9 is a flow diagram of an example method for dynamically compensating for thermally induced changes in output from the light-emitting elements in an array.

FIG. 9 is a flow diagram of an example method 50 of providing for pixel-by-pixel level thermally induced light intensity compensation. The method 50 includes, at step 52, producing or receiving information regarding the content to be displayed on an array of pixels (also referred to hereinafter as "content information" for the sake of brevity), such as on the array 30 of pixels 32 shown in FIG. 3 or the array of pixels 22 on the display module 12 of 2 and in the overall display 10 of FIG. 1. The content information can include a specified light output for each pixel in the array (also referred to hereinafter as "light output information"), as a function of time over a specified period of time.

As used herein, the term "specified light output" can refer to a specified intensity of light that is to be emitted from a particular pixel and/or from a particular light-emitting element in the array. If the array is configured to display a plurality of colors, then "light output" can refer to a specified color and specified intensity that the particular pixel is to display at a specific point during the specified period of time. As will be understood by a person having ordinary skill in the art, for a multi-color array each pixel includes a plurality of differently-colored light-emitting elements, such as the pixels 32 described with respect to FIG. 3, wherein each pixel 32 comprises at least one red LED 34, at least one green LED 36, and at least one blue LED 38, different colors can be selected by varying the relative intensity of the differently-colored light-emitting elements of the pixel. For this reason, the light output information for a particular pixel can include a specified intensity for each of the light-emitting elements in the pixel. For example, for the RGB pixels 32 in the array 30 of FIG. 3, the light output information can include, for a particular specified pixel 32, a first specified intensity for the red LED 34 of that particular pixel 32, a second specified intensity for the green LED 36 of the same particular pixel 32, and a third specified intensity for the blue LED 38 of the same particular pixel 32, wherein the first, second, and third specified intensities are selected to achieve a specified color that the specified pixel 32 is to generate for each moment of the specified period of time and to achieve a specified overall intensity for the pixel at each moment of the specified period of time.

As will be understood by a person having ordinary skill in the art, while the specified light intensity is the primary goal of the specified light output according to the specified content information, the specified light intensity will also result in a corresponding expected heat output. For example, as noted above, a specified light output can include specified intensities for each of the red, green, and blue LEDs 34, 36, 38. Each specified intensity can be translated to a corresponding specified power output (e.g., either as current supplied to the LED 34, 36, 38 or a duty cycle of the LED 34, 36, 38) for each LED 34, 36, 38, which results in both the specified intensity but also a corresponding amount of heat produced by each LED 34, 36, 38 that is related to the amount of power (e.g., higher power for higher light intensity corresponds to higher heat production).

As is used herein, the phrase "as a function of time" when referring to a particular variable, refers to a data set of the value or values of the variable in question at various specific times throughout the course of the specified period of time, and in particular to data sets where the variable changes at least once during the specified period of time, such as those where the variable changes regularly throughout the course of the specified period of time. Although the present disclosure uses the word "function," which generally refers to a specific mathematical equation where a dependent variable is dependent on the time after an initial time t=0, the present method is not limited to the particular variable actually being mathematically dependent to time during the specified period of time. For example, the light output information for each pixel in the array can specify light output for each pixel "as a function of time" even if there is no specific mathematic relationship between the time and the light output. Rather, the "function of time" could merely be a list of values for the light output of each pixel that was specifically chosen by a programmer of the array so that as a whole, the pixels of the array will cooperatively produce content that appears, to the human eye, as textual, graphical, or video information that changes over the specified period of time that the array is operated.

In an example, the content information is programmed by or for the owner or operator of the array depending on the purpose of the array. For example, if the array is configured as an electronic advertising board (such as a roadside electronic billboard or an electronic advertising board in a shopping area, sports stadium, or other public space), then the content information can be programmed to correspond to information that a customer of the owner or operator paid to have displayed on the array. In another example, the array can be configured as an electronic scoreboard in a sports stadium and the content information can be to display sports statistics, or to display animations, live video, or recorded video to the game attendees.

As will be appreciated by those having skill in the art, it is common for the content to be displayed on the electronic array of pixels to include static or slowly moving content, especially in the case of an array configured for use as an electronic advertising display. As described above, the existence of static or slow-moving content can result in content ghosting, such as in the rudimentary example described above with respect to FIGS. 5-8.

The step of producing or receiving content information is common practice for any owner or operator of an electronic display. The remainder of the method 50 takes information that is already commonly provided in the content information and uses the information to determine an expected change in light output intensity that is expected to occur due to the heating of the pixels caused by lighting the pixels at the specified light outputs and then compensates for the expected change by modifying the output of one or more of the pixels as a function of time based on the expected change in light output that is determined.

To achieve this goal, the method 50 includes, after receiving or producing the content information (step 52), at step 54, determining an expected temperature for each of a specified one or more of the pixels in the array as a function of time. In an example, determining the expected temperature of step 54 can include a separate determination for each of the specified one or more pixels for which the expected temperature is to be determined (which are also referred to hereinafter as "target pixels" when referring to the specific pixels for which calculations are being performed to determine the temperatures of those pixels). In an example, determining the expected temperature for each of the one or more target pixels of step 54 can include a separate determination for each of the one or more target pixels for which the expected change in light output intensity is to be determined in the following step 56 (described below).

In an example, step 54 can include performing one or more calculations for each target pixel at specified time intervals throughout a specified period of time (for example, once every 1/30 of a second for an array operating at a frame rate of 30 frames per second (FPS) or once every 1/60 of a second for an array operating at a frame rate of 60 FPS, although a calculation need not be run for every frame during the operation of the array).

In an example, the temperature that is determined for a particular target pixel in step 54 is dependent, at least in part, on the specified light output for that same target pixel (i.e., with a higher specified light output intensity for the target pixel corresponding to a higher expected temperature for the same target pixel). As noted above, the specified light intensity for the target pixel will have a corresponding expected heat output for the target pixel due to the fact that light intensity is modified by changing the electrical input to one or more LEDs of the target pixel (e.g., but setting the current input and/or duty cycle for one or more LEDs of the target pixel). Therefore, when describing that a temperature that is determined for a target pixel in step 54 can be "dependent, at least in part, on the specified light output for the target pixel," those of skill in the art will understand that this determination of temperature can take into account this relationship between the specified electrical input to the LEDs of the target pixel (for the purposes of achieving the specified light intensity) and the expected heat output of the LEDs of the target pixel due to the specified electrical input.

In some examples, the expected temperature for a particular target pixel that is determined in step 54 is dependent, at least in part, on the specified light output of at least a portion of the pixels in the array, such as the specified light output for the target pixel and the specified light output for a specified set of pixels that are proximate to the target pixel (e,g., that are within a specified distance from the target pixel such that heat generated by one of the specified set of pixels can be conducted to the target pixel and potentially raise the temperature of the target pixel or such that heat generated by the target pixel can be transferred from the target pixel to one or more of the specified set of pixels to potentially heat the one or more pixels of the specified sets and cool the target pixel). Similarly, when describing that a temperature that is determined for a target pixel in step 54 can be "dependent, at least in part, on the specified light output for the specified set of pixels that are proximate to the target pixel," those of skill in the art will understand that this determination of the temperature can take into account the relationship between the specified electrical input to the LEDs of the specified set of pixels proximate to the target pixel (for the purpose of achieving the specified light intensity for each of the specified set of pixels) and the expected heat output of the LEDs from the specified set of pixels that are proximate to the target pixel.

In an example, a mathematical model was used to perform the step of determining an expected temperature for each of the one or more target pixels for which the expected change in light output intensity is to be determined in step 56 (described below). In an example, the mathematical model estimates an expected heat output from the target pixel, as a function of time, which it uses as a factor to determine the expected temperature of the target pixel as a function of time. In an example, the expected heat output from the target pixel is dependent, at least in part, on its own specified light output (as specified in the content information from step 52). The expected temperature of the target pixel can be calculated based, at least in part, on the expected heat output from the target pixel and, in some examples, the expected temperature of a target pixels can depend, at least in part, on the expected heat output for each a specified set of pixels that are proximate to the target pixel (e.g., pixels that are within a specified distance from the target pixel). And, the expected heat output from each of the specified set of pixels can depend, at least in part, on the specified light output for that particular one of the specified set of pixels.

In an example, the step of determining the expected temperature of the target pixel (step 54) includes determining the amount of heat that is expected to be generated by the target pixel but that is expected to be transferred away from the target pixel to one or more pixels that are proximate to the target pixel over time, such as via heat conduction through the one or more support structures of the array. The step of determining the expected temperature of a particular target pixel can also include estimating the portion of heat that is expected to be generated by pixels other than the target pixel (e.g., pixels that are proximate to the target pixel within a specified distance) and that is expected to be transferred to the target pixel, such as via heat conduction.

In an example, determining the expected temperature of each target pixel (step 54) includes determining the expected heat that will be generated by a specified set of pixels in the array as a function of time, wherein the heat generated by each pixel is dependent, at least in part, on the light output specified for that pixel in the content information from step 52. The amount of heat generated by each pixel can be determined based on the known specifications of the light-emitting elements that make up the pixel for which the heat generation is being determined and the specified light output according to the content information provided or received in step 52. In an example, determining the expected temperature of each target pixel (step 54) can include determining the expected heat generated as a function of time for each pixel in the entire array. When the expected heat to be generated by all of the pixels in the array, as a function of time, is determined, then it can make it possible to determine the expected temperature for each of the pixels in the array, as a function of time. In other words, by determining the heat generated by each and every pixel, as a function of time, step 54 can be performed so that each and every pixel in the array can be treated as a target pixel in the calculations for determining the expected temperatures of the target pixels, as a function of time.

The model can then be used to determine the expected temperature and the expected change in light output intensity for each of a plurality of the pixels in the display, for example by running the calculations of the model once for every pixel in the plurality, with each pixel being the target pixel in one set of the calculations. In an example, the model can be run to determine one or both of the expected temperature and the expected change in intensity for at least about 50% of the pixels plus at least one additional pixel), for example, for at least about 75% of the pixels in the display, such as for at least about 80% of the pixels in the display, for example, for at least about 85% of the pixels in the display, such as for at least about 90% of the pixels in the display, for example, for at least about 92.5% of the pixels in the display, such as for at least about 95% of the pixels in the display, for example, for at least about 97.5% of the pixels in the display, such as for at least about 98% of the pixels in the display, for example, for at least about 99% of the pixels in the display, such as for at least about 99.5% of the pixels in the display, for example, for at least about 99.9% of the pixels in the display, such as for at least about 99.99% of the pixels in the display, and in an example, for all of the pixels in the display.

The inventors of the present subject matter made several assumptions when developing the example model described herein. These assumptions were based on observations of the performance of commonly-used LEDs and array construction. The specific assumptions described herein are not necessarily limiting, but rather will be understood by those having skill in the art as a specific example of a method by which pixel-by-pixel level light output compensation can be achieved. Those having skill in the art will appreciate, however, that other assumptions or models could be used if those other assumptions or models more readily explain the actual changes in temperature and corresponding changes in light output intensity.

In an example, the expected temperature at a specific target pixel can be determined by a transient temperature model. In an example, the transient temperature model is described by Equation [1]:

$$T(t)=T_{SS}+(T_i-T_{SS})e^{-bt} \quad [1]$$

where "t" is the time after a change in thermal input to the target pixel or thermal output from the target pixel, measured in seconds, wherein an initial time (i.e., t=0) refers to the point in time when the thermal input to or the thermal input from the target pixel changes (either in the form of the light output from the target pixel changing in intensity, which results in a change in the heat output by the target pixel, or in the form of a change in thermal load into the target pixel from a heat source external to the target pixel, such as heat generated due to the light output from another pixel or from another heat producing source) or a change in the thermal load out of the target pixel to another structure such as another pixel that is proximate to the target pixel or to a heat sink structure; "T(t)" is the temperature, in ° C., at the target pixel at time t; "$T_i$" is the initial temperature of the target pixel at t=0; "$T_{SS}$" is the steady state temperature, in ° C., for the target pixel, after the temperature is allowed to reach steady state based on the thermaload into or out of the target pixel; and "b" is a system time constant.

Figure 10:
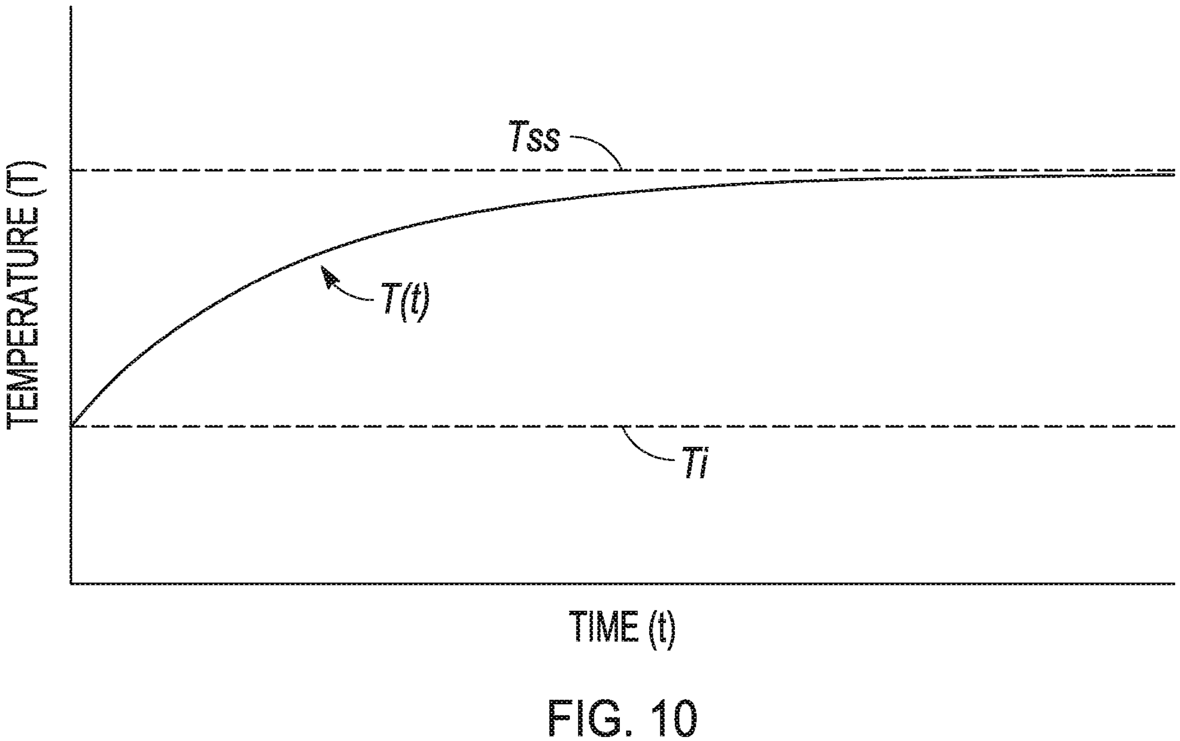
FIG. 10 is a graph of an example mathematical representation of a transient temperature experienced at a specific pixel within an array as constant content is being displayed on the array.

A graphical representation of the transient temperature T(t) of Equation [1] is shown in FIG. 10, wherein the array was allowed to operate under the same light output conditions for a long enough period of time so that the target pixel is heated from its initial temperature $T_i$ to the steady state temperature $T_{SS}$, or at least so that the temperature T(t) of the target pixel is very close to reaching the steady state temperature $T_{SS}$.

In an example, the system time constant b is specific to the particular physical configuration of the display within which the pixel is located. In an example, the system time constant b can be determined by operating the display module under specified conditions such that the initial temperature $T_i$ and the eventual steady state temperature are known in advance so that the system time constant b can be determined empirically, and then the empirically determined system time constant b can be assumed to be constant or substantially constant during operation of the display. If a different physical-configuration display module is used for another application, than a different system time constant b will need to be determined empirically.

In an example, the steady state temperature $T_{SS}$ can be determined based on what the theoretically expected steady state temperature for a target pixel for a particular thermal load. As used herein, the term "thermal load" refers to any thermal input into the target pixel that can tend to heat the target pixel to higher than its current temperature or any thermal output out of the target pixel that can tend to cool the target pixel to lower than its current temperature. The concept of a thermal load can be used to determine the steady state temperature of the target pixel according to Equation [1]. In an example, the primary thermal load input for each target pixel is the heat that is generated by the target pixel itself, i.e., heat generated by the LEDs of the target pixel as they are illuminated to generate the specified light output according to the content information from step 52.

Other thermal loads can include, but are not limited to, heat generated by one or more pixels that are proximate to the target pixel (e.g., because of light output from the one or more proximate pixels) or heat generated by another component, such as a power source for a display model that makes up the array or another electronic component that is in close enough proximity to the target pixel that heat from the electronic component can be expected to be transferred to the target pixel. Equation [1] can provide a mathematical characterization of the expected temperature for a specified target pixel for a specified time period in which the content of the array is constant, or at least where the content of the target pixel itself and any pixels that are close enough to the target pixel that they could potentially be a heat source for the target pixel (which would tend to increase the temperature of the target pixel) or that could be a heat sink to which heat from the target pixel could flow (which would tend to cool the target pixel to a lower temperature). For the sake of brevity, these pixels that are close enough to the target pixel such that heat produced by one or more of those proximate pixels can affect the temperature of the target pixel or that are close enough such that heat produced by the target pixel can affect the temperature of one or more of those proximate pixels will be referred to hereinafter as "potential thermal load pixels" or simply "thermal load pixels."

The specific thermal load that is assumed to be transferred from a thermal load pixel to the target pixel or vice versa can depend on several factors such as the distance between the thermal load pixel and the target pixel, the expected heat output to be generated by the thermal load pixel when emitting the specified light intensity of that thermal load pixel (e.g., the expected heat generated by one or more LEDs of the thermal load pixel based on the electrical input to the one or more LEDs that will result in the specified light intensity), the expected thermal energy to be generated by the target pixel when emitting the specified light intensity of the target pixel (e.g., the expected heat generated by one or more LEDs of the target pixel based on the electrical input to the one or more pixels that will result in the specified light intensity), and the physical configuration of the display at or proximate to the thermal load pixel and the target pixel. For example, the pixels that are immediately adjacent to the target pixel can be assumed to have a larger thermal load contribution to the target pixel compared to pixels that are far away from the target pixel. Similarly, a thermal load pixel that has a higher heat output (i.e., that will be at a higher temperature) based on the content being displayed on that pixel can be assumed to have a higher thermal load contribution to the target pixel compared to a second pixel that is the same distance from the target pixel but that has a smaller heat output based on the content being emitted from the second pixel. Or, for thermal load pixels that are cooler than the target pixel, a thermal load pixel that has a lower heat output such that it will have a lower temperature based on its specified light intensity can be assumed to receive more heat from the target pixel compared to a second pixel that is the same distance from the target pixel but that has a temperature that is closer to that of the target pixel.

The transfer of heat from a thermal load pixel to the target pixel or vice versa can be described by determining or assuming the thermal impedance between adjacent pixels. As used herein, the term "thermal impedance" refers to how readily heat is transferred to the target pixel from a potential thermal load pixel or vice versa. A low thermal impedance means that heat transfers easily from the thermal load pixel to the target pixel or vice versa (e.g., a high thermal conductivity for the structure or structures between the thermal load pixel and the target pixel). Conversely, a high thermal impedance means that heat transfer between the thermal load pixel and the target pixel is prevented or limited (e.g., because of low thermal conductivity in the structure or structures between the thermal load pixel and the target pixel).

Both the actual thermal output from a particular thermal load pixel (based on the specified light output intensity for that thermal load pixel) and the thermal impedance between that particular thermal load pixel and the target pixel can be used to determine an expected thermal load from the particular thermal load pixel onto the target pixel or vice versa, from the target pixel to the thermal load pixel. The overall expected thermal load of all the potential thermal load pixels on the target pixel can then be used to determine the expected steady state temperature $T_{SS}$ of the target pixel for the particular light output conditions. The modeling of thermal impedance and its result on the predicted thermal load, which in turn affects the expected steady state temperature $T_{SS}$, can involve several assumptions that may depend on the configuration of the display, including the structure or structures to which the LEDs are mounted and their thermal conductivities and the presence of heat producing components, like a power supply or LED drivers, or heat sink structures, such as the edge of a display module or a structure with high heat conductivity that can dissipate heat quickly.

During any particular time period time after t=0 when the content being displayed by the target pixel and any potential thermal load pixels is constant, the current version of Equation [1] can be used to find an expected temperature for the target pixel over that time period. But, once the content is to be changed for any of these pixels (i.e., when the specified light output is changed for the target pixel or any potential heat load pixel), then a new version of Equation [1] may have to be determined. Specifically, the change in the specified content will require the use of a new initial temperature $T_i$, which will be the temperature of the target pixel at the moment the content changes, and a determination of a new steady state temperature $T_{SS}$ because the change in content will result in a new rate of heat generation for the target pixel itself or for one of more of the potential thermal load pixels, or both, because of a change in light output corresponding to the change in content for the target pixel and/or one or more of the potential thermal load pixels.

In general, a transient temperature model can be developed for each target pixel in the array, wherein the model for each specific target pixel comprises a series of different versions of Equation [1], with each version of Equation [1] corresponding to a different set of light output conditions for the target pixel and any potential thermal load pixels corresponding to that target pixel. In other words, each point in time that the content information from step 52 dictates a change in light output for that particular target pixel or for any potential thermal load pixel corresponding to that target pixel becomes the time t=0 for a new version of Equation [1] (with a new initial temperature $T_i$ equal to the expected transient temperature according to the previous version of Equation [1] at the time immediately before the change in light output, and a new expected steady state temperature $T_{SS}$ dependent, at least in part, on the expected heat to be generated by the target pixel and any potential thermal load pixels based on the specified light output for the target pixel and any potential thermal load pixels for the new period of time). This will result in a series of different versions of Equation [1] that can be strung together to provide a mathematical calculation of the expected temperature for the particular target pixel at any point in time during the operation of the array according to the specific content information of step 52. This process of determining the overall transient temperature model can be repeated for each target pixel for which the expected temperature is being determined in step 54.

In some examples, the heat generated or absorbed by individual light-emitting elements may differ, even within the same target pixel. For example, in the pixels 32 described above with respect to FIG. 3, the temperature change of the individual red LED 34, green LED 36, and blue LED 38 of each target pixel 32 may not be uniform, even within the same target pixel 32. This can potentially occur because the different LEDs 34, 36, 38 of each target pixel can be lit at different intensities and for different periods of time depending on the light output that is specified for the target pixel 32 according to the content information from step 52. Therefore, in an example, determining the expected temperature for a target pixel (step 56) can include determining the expected temperature for one or more of the light-emitting elements that make up the target pixel. In an example, this can include separately determining the expected temperature for each of the light-emitting elements of the target pixel. In an example, the expected temperature that is determined for any particular light-emitting element can be dependent, at least in part, on the expected heat generated by the target pixel (or individual light-emitting elements of the target pixel) based on the specified light output for the target pixel or for each light-emitting element in the target pixel and can also depend, at least in part, on the expected heat generated by one or more potential thermal load pixels or individual light-emitting elements of one or more potential thermal load pixels based on the specified light output of one or more potential thermal load pixels proximate to the target pixel, as specified in the content information from step 52. For example, in each of the pixels 32 in the array 30 described above with respect to FIG. 3 there is a red LED 34, a green LED 36, and a blue LED 38. For these types of pixels 32, step 54 can include one or any combination of: determining the expected temperature for the red LED 34 of the target pixel 32 based, at least in part, on the expected heat generated corresponding to the specified light output for the target pixel 32 and/or for one or more thermal load pixels, as specified in the content information of step 52; determining the expected temperature for the green LED 36 of the target pixel 32 based, at least in part, on the expected heat generated corresponding to the specified light output for the target pixel 32 and/or for one or more thermal load pixels proximate to the target pixel 32, as specified in the content information of step 52; and determining the expected temperature for the blue LED 38 of the target pixel 32 based, at least in part, on the expected heat generated corresponding to the specified light output for the target pixel 32 and/or for one or more thermal load pixels proximate to the target pixel 32, as specified in the content information of step 52.

In other examples, the expected temperature for each of the target pixels that is determined by step 54 can be dependent on heat sources other than the target pixel itself or any potential thermal load pixels that are proximate to the target pixel. For example, another structure or component can act as a heat source to further increase the steady state temperature $T_{SS}$ of the target pixel, or to change the value of the system time constant b, which can cause the target pixel to heat up faster. For example, an electrical component that is part of the overall display can generate additional heat beyond the heat generated by the pixels themselves, such as a power supply component or a controller for the display as a whole or for an individual display module. If this electrical component is in close enough proximity to a target pixel, then its generated heat can change the way in which the target pixel is heated and therefore can modify the transient behavior of the target pixel's temperature. Therefore, in an example, determining the expected temperature of a target pixel (step 54) can include considering heat generated by an electrical component that is proximate to the target pixel.

In other examples, one or more structures of the display can less effectively dissipate heat and can, therefore, result in localized heat buildup even if the structure does not, by itself, generate additional heat. For example, seams between adjacent display modules within a multi-module display can act as a heat insulator, which can result in the buildup of heat along edges of the display modules, which can affect the temperature of any target pixels that are located at or near one of the module edges. Therefore, in an example, determining the expected temperature of a target pixel (step 54) can include considering less efficient heat dissipation and/or heat buildup at or proximate to the target pixel.

In another example, one or more structures of the display or conditions can act as a heat sink that can carry heat away or otherwise dissipate heat from a target pixel faster than the heat might otherwise dissipate if the heat sink structure were not present. For example, certain parts of a support structure (such as a support chassis or supporting portions of a display module) can be made from material that has a higher heat conductivity than other structures in the display. In another example, one or more parts of the array can be more likely to be exposed to air flow that will tend to cool the pixels that are located in those areas higher than other portions of the array that are less likely to experience cooling airflow. When this occurs, any target pixels that are located proximate to a heat sink can be cooled more than pixels in other parts of the array. In the event of a heat sink , the steady state temperature $T_{SS}$ can be reduced and/or the system time constant b can be changed so that the steady state temperature $T_{SS}$ is reached at a different pace. Therefore, in an example, determining the expected temperature of a target pixel (step 54) can include considering heat dissipated by a heat sink that is proximate to the target pixel.

In short, in an example, determining the expected temperature of a target pixel (step 54) can include considering the location of the particular target pixel within the array and whether there are conditions external to the target pixel and/or any potential thermal load pixels that will affect the temperature of the target pixel. In particular, determining the expected temperature of the target pixel (step 54) can include incorporating one or more of the following into the calculation of the expected temperature of the target pixel: heat generated by a heat generating source, heat dissipated by a heat sink, and heat that tends to build up at a structure at or proximate to the target pixel.

In an example, the expected temperature for each of the target pixels, as determined in step 54, can be recorded or kept track of with a thermal map. As used herein, the term "thermal map" can refer to any means of keeping track of the temperature, for each time t during the operation of the array, and for all of the specified target pixels (which, as noted above, can, in an example, be a majority of the pixels in the array all the way up to 90% or more of the pixels in the array, or even all or substantially all of the pixels in the array). Although the word "map" implies a visual representation of the pixel temperatures, the "thermal map" that is used as part of the method 50 does not need to be a visual representation. But, in general, the thermal map will contain all the data, on a pixel-by-pixel basis, such that a visual representation of the temperatures of the target pixels could be prepared at any particular point in time during the operation of the array. In other words, the thermal map can be thought of a thermal database that includes data for the target pixels of the array, with each data point identifying the specific location of a particular target pixel (e.g., a target pixel address, such as the specific row and column for a particular target pixel), a specific time during the operation of the array, and the temperature of the particular target pixel at that specific time. In an example, the thermal map could then be used to determine what the expected temperature of any specified target pixel at any point in time during the operation of the array, which could then be used for the next step of the method 50.

After determining the expected temperature for each of the specified target pixels (step 54), the method 50 includes, at step 56, determining an expected change in light output intensity for each of the specified one or more of the pixels as a function of time, e.g., for one or more specified target pixels within the array. In an example, determining the expected change in light output intensity of step 56 can include a separate determination for each of the one or more target pixels for which the expected change in light output intensity is to be determined (e.g., for one or more of, and in some examples each of, the "target pixels" for which the expected temperature was determined in step 54). In an example, the expected change in light output intensity for the target pixel that is determined in step 56 is dependent, at least in part, on the expected temperature that was determined in step 54. In other words, in an example, the expected temperature of a particular target pixel from step 54 is used to calculate the expected change in light output intensity for that same target pixel in step 56.

As described above, in an example, the light output intensity that a LED or other light-emitting element is able to produce is inversely related to its temperature. For example, the light output intensity from the red, green, and blue LEDs 34, 36, 38 in the pixels 32 of the array 30 described above can have the relationship shown in FIG. 4. In an example, the determination of the expected change in light output intensity for the target pixel of step 56 can include determining or receiving data regarding the relationship between temperature and light output intensity for one or more of the specific light-emitting elements in the target pixel and determining the expected light output intensity for one or more of the light-emitting elements in the target pixel at the expected temperature. For example, data regarding output intensity for each particular light-emitting element may be provided by the supplier of the light-emitting elements, or experiments can be run on each of the different types of light-emitting elements in the array to determine the light output intensity capability at temperatures that the light emitting elements are expected to experience. Once the data regarding the relationship between temperature and light output intensity is received or determined, that data can be used, along with the expected temperature of each target pixel as determined in step 54, to determine the expected change in light output intensity for the target pixel and/or for each light-emitting element that makes up the target pixel. This determination of the expected change in light output intensity can be determined at specified time intervals using the expected temperature at each particular time (for example, once every 1/30 of a second for an array operating at a frame rate of 30 frames per second (FPS) or once every 1/60 of a second for an array operating at a frame rate of 60 FPS).

In an example, determining the expected change in light output intensity for the target pixel (step 56) can include determining the expected change in light output intensity for one or more of the light-emitting elements that make up the target pixel. In an example, this can include separately determining the expected change in light output intensity for each of the light-emitting elements of the target pixel. In an example, the expected change in light output intensity that is determined for any particular light-emitting element of the target pixel can be dependent, at least in part, on the expected temperature that was determined for the target pixel or for each light-emitting element in the target pixel, as determined in step 54. For example, in each of the pixels 32 in the array 30 described above with respect to FIG. 3 there is a red LED 34, a green LED 36, and a blue LED 38. For these types of pixels 32, step 56 can include one or any combination of: determining the expected change in light output intensity for the red LED 34 of the target pixel 32 based, at least in part, on the expected temperature of the target pixel 32 and/or the expected temperature of the red LED 34, as determined in step 54; determining the expected change in light output intensity for the green LED 36 of the target pixel 32 based, at least in part, on the expected temperature of the target pixel 32 and/or the expected temperature of the green LED 36, as determined in step 54; and determining the expected change in light output intensity for the blue LED 38 of the pixel 32 based, at least in part, on the expected temperature of the target pixel 32 and/or the expected temperature of the blue LED 38, as determined in step 54.

After determining the expected change in light output intensity for each of the target pixels and/or the light-emitting elements of each target pixel (step 56), the method 50 includes, at step 58, modifying light output of each of the one or more target pixels as a function of time to compensate for at least a portion of the expected change in light output intensity for the target pixel. In an example, modifying the light output for each of the one or more target pixels in step 58 can include determining a light output offset for each of the one or more target pixels for which the expected change in light output intensity was determined in step 56 and then applying the determined light output offset to each of the one or more target pixels whose light output is being modified in step 58.

As will be appreciated by those having skill in the art, in an example, the intensity of the light being emitted by the one or more light-emitting elements of the target pixel can be dependent on the current being supplied to the light-emitting element and/or to the duty cycle of the power being supplied to the light-emitting element. Therefore, in an example, applying the determined light output offset includes modifying the current being supplied to one or more of the light-emitting elements of the target pixel so that the light output intensity of the one or more of the light emitting elements of the target pixel will be modified to offset at least a portion of the expected change in light output intensity determined by step 56. For example, if the expected change in light output intensity determined by step 56 for a particular target pixel is a decrease in light output intensity of about 10% compared to the specified light output of the content information of step 52, then the current supplied to the light-emitting elements of the target pixel can be increased to result in a corresponding increase in light output intensity that makes up for at least a portion of this 10% loss in light output intensity. In another example, applying the determined light output offset includes modifying the power duty cycle for the light-emitting elements of the target pixel so that the light output intensity of one or more of the light emitting elements of the target pixel will be modified to offset at least a portion of the expected change in light output intensity determined by step 56. For example, if the expected change in light output intensity from step 56 is the same 10% decrease, then the duty cycle for the light-emitting elements of the target pixel can be increased to result in a corresponding increase in light output intensity for the target pixel that makes up for at least a portion of this 10% loss in light output intensity.

In an example, modifying the light output for each of a target pixel (step 58) can include modifying the light output for one or more of the individual light-emitting elements that make up the target pixel. In an example, modifying the light output of the target pixel (step 58) can include separately modifying the light output for each of the light-emitting elements that make up that target pixel. For example, in the pixels 32 of the array 30 that each include a red LED 34, a green LED 36, and a blue LED 38, step 58 can include one or any combination of: modifying the light output of the red LED 34 of the target pixel 32 based, at least in part, on the expected change in light output intensity of the red LED 34 of the target pixel 32 that was determined in step 56; modifying the light output of the green LED 36 of the target pixel 32 based, at least in part, on the expected change in light output intensity of the green LED 36 of the target pixel 32 that was determined in step 56; and modifying the light output of the blue LED 38 of the target pixel 32 based, at least in part, on the expected change in light output intensity of the blue LED 38 of the target pixel 32 that was determined in step 56.

Modifying the light output of a particular light-emitting element of a target pixel as part of step 58 can include, for example, modifying the current supplied to the particular light-emitting element or modifying the power duty cycle for the particular light-emitting element, or both, to compensate for the expected change in light output intensity for that particular light-emitting element that was determined in step 56. For example, for the example pixels 32 of the array 30, step 58 can include one or any combination of: modifying the supplied current or the power duty cycle, or both, for the red LED 34 of the target pixel 32 to compensate for the expected change in light output intensity of the red LED 34 of the target pixel 32 determined in step 56; modifying the supplied current or the power duty cycle, or both, for the green LED 36 of the target pixel 32 to compensate for the expected change in light output intensity of the green LED 36 of the target pixel 32 determined in step 56; and modifying the supplied current or the power duty cycle, or both, for the blue LED 38 of the target pixel 32 to compensate for the expected change in light output intensity of the blue LED 38 of the target pixel 32 that was determined in step 56.

Figure 11:
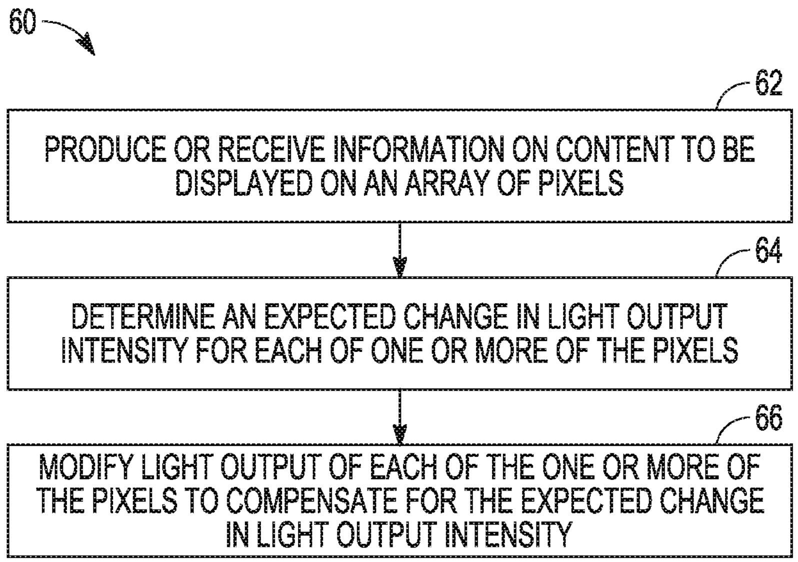
FIG. 11 is a flow diagram of another example method for dynamically compensating for thermally induced changes in output from the light-emitting elements in an array.

FIG. 11 is a flow diagram of another method 60 of providing for pixel-by-pixel level thermal-based light output compensation. The method 60 is a variation on the method 50 described above with respect to FIG. 9, Similar to the method 50, the method 60 includes, at step 62, producing or receiving information regarding the content to be displayed on an array of pixels, which can include specified light output information for each pixel in the array as a function of time over a specified period of time. The step 62 of the method 60 can be substantially the same as or identical to the step 52 described above for the method 50 of FIG. 9.

After receiving or producing the content information (step 62), the method 60 includes, at step 64, determining an expected change in light output intensity for each of the specified one or more of the pixels as a function of time. As described above, change in light output intensity for the light-emitting elements of a target pixel tends to follow a well-known inverse relationship relative to the temperature of the target pixel, e.g., wherein an increase in temperature of a certain amount for a particular light-emitting element will result in a predictable reduction in the light output intensity of that light-emitting element based on the known relationship between the temperature and the potential light output intensity of the light-emitting element. In addition, as described in detail with respect to the method 50, the expected temperature of each target pixel can be fairly reliably predicted based, at least in part, on the specified light output for the target pixel and/or for one or more thermal load pixels, such as via the mathematical model represented by Equation [1].

Because of the reliably predictable nature of the temperature as a function of the specified light output information provided in step 62, and the also reliably predictable response in light output intensity based on this expected temperature, it is possible to design the method 60 of compensating for changes in light output intensity based on the specified light output information being used to control the array without necessarily having to actually calculate the expected temperature of each pixel as a function of time. In other words, before the method 60 is actually performed, initial converting calculations can be made based on the specific light-emitting elements that make up the array, which can be used, in essence, to combine step 54 and step 56 from the method 50 into a single calculation step 64 for the method 60.

Put another way, rather than developing a mathematical model to determine a transient temperature at each specified target pixel based, at least in part, on specified light output information, as represented by Equation [1] and described above with respect to step 54 of the method 50, discussed above, a different mathematical model can be developed for the method 60 that determines the expected change in light output intensity more directly based, at least in part, on the specified light output. In an example, an expected light output intensity at a specific target pixel can be determined by a transient light intensity model as described by Equation [2]:

$$L(t)=L_{SS}+(L_i-L_S)e^{-bt} \qquad [2]$$

where "t" is defined the same as in Equation [1] (i.e., the time after a change in the specified light output for the target pixel and/or after a change in the specified light output for one or more pixels that are within a specified distance from the target pixel, e.g., one or more of the "potential thermal load pixels" described above), wherein an initial time (i.e., t=0) refers to the point in time when the specified light output for the target pixel or for one of the potential thermal load pixels changes; "L(t)" is the light output intensity of the target pixel at time t; "$L_i$" is the initial light output intensity of the target pixel at t=0; "$L_{SS}$" is the steady state light output intensity, for the target pixel, which is determined based, at least in part, on the expected thermal load into or out of the target pixel, which in turn is based, at least in part, on its own specified light output and/or on the specified light output for the one or more potential thermal load pixels; and "b" is a system time constant, which can be similar or identical to the time constant b described above with respect to Equation [1].

Figure 12:
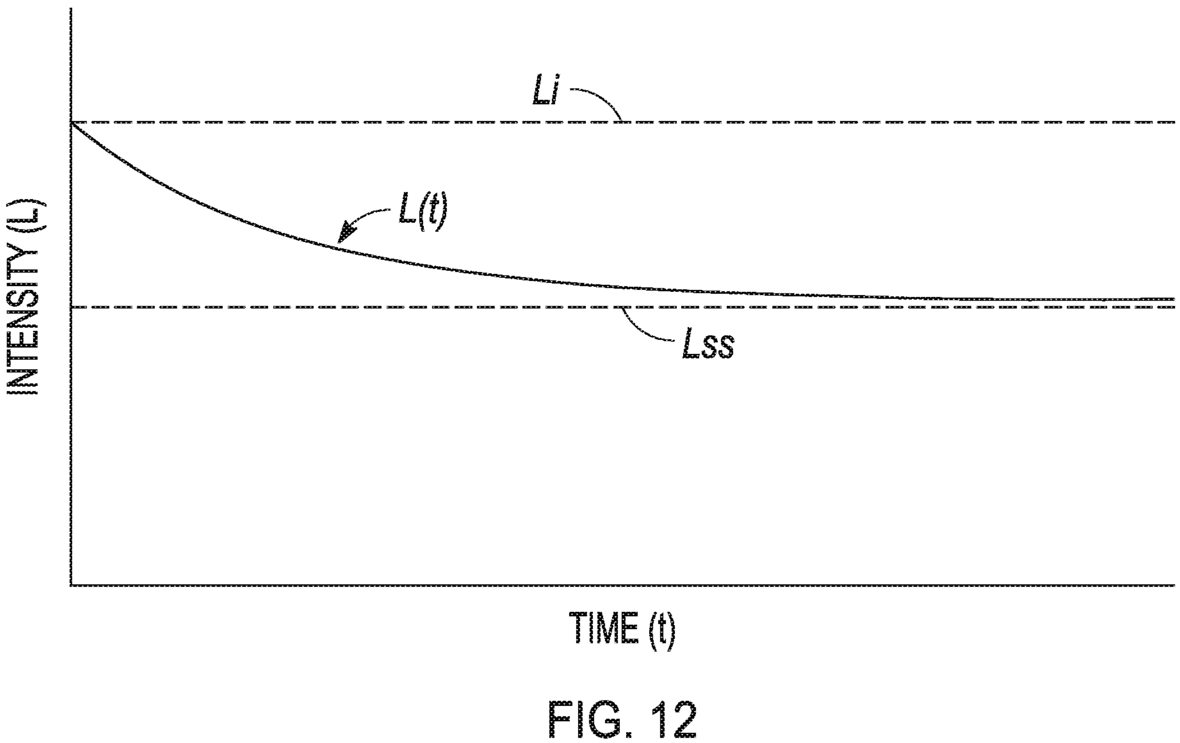
FIG. 12 is a graph of an example mathematical representation of a transient light intensity experienced at a specific pixel within an array as constant content is being displayed on the array.

A graphical representation of the transient intensity L(t) of Equation [2] is shown in FIG. 12, wherein the array was allowed to operate under the same light output conditions for a long enough period of time so that the output intensity L(t) of the target pixel changes from its initial temperature $L_i$ to the steady state intensity $L_{SS}$, or at least so that the output intensity of the target pixel is very close to reaching the steady state intensity $L_{SS}$. As can be seen by a comparison of the transient temperature T(t) in FIG. 10 and the transient intensity L(t) in FIG. 12, the transient intensity L(t) behaves as an inverse version of the transient temperature T(t).

The factors that go into determining the steady state intensity $L_{SS}$ can be similar to those described above for determining the steady state temperature $T_{SS}$ for Equation [1]. These factors include, but are not limited to, the thermal load that would be expected for the target pixel based, at least in part, on the specified light output provided from step 62. Those having ordinary skill in the art will readily be able to understand how to determine the steady state intensity $L_{SS}$ for Equation [2] based on the discussion of determining the steady state temperature $T_{SS}$ discussed above with respect to step 54 for method 50.

In an example, determining the expected change in light output intensity of step 64 can include a separate determination for each of the one or more pixels for which the expected change in light output intensity is to be determined (e.g., for each of the specified one or more "target pixels"). This can include performing one or more calculations for each pixel being determined at specified time intervals throughout the specified period of time (for example, once every 1/30 of a second for an array operating at a frame rate of 30 frames per second (FPS) or once every 1/60 of a second for an array operating at a frame rate of 60 FPS). In an example, the expected change in light output intensity that is determined for a particular target pixel in step 64 is dependent, at least in part, on the specified light output for the target pixel. In some examples, the expected change in light output intensity for the target pixel that is determined in step 64 is dependent, at least in part, on the specified light output of at least a portion of the pixels in the array, such as the specified light output for the target pixel and/or the specified light output for one or more potential thermal load pixels that are proximate to the target pixel, e.g., that are within a specified distance from the target pixel.

As described in more detail above, determining the expected change in light output (step 64) can include determining an expected temperature for each of the one or more target pixels as a function of time and then using that expected temperature for each target pixel to determine the expected change in light output intensity for the target pixel based on the well-understood relationship between temperature on light output from light-emitting elements such as LEDs. As is also described in more detail below, the expected temperature for each of the target pixels can depend, at least in part, on the specified light output at each of one or more target pixels for which the expected change in light output is being determined in step 64.

In an example, the expected change in light output intensity that is determined for any particular light-emitting element of the target pixel (step 64) is dependent, at least in part, on the specified light output of at least a portion of the pixels in the array, such as the specified light output for the target pixel and/or the specified light output for the target pixel and one or more thermal load pixels that are proximate to the target pixel.

In an example, determining the expected change in light output intensity for the target pixel (step 64) can include determining the expected change in light output intensity for one or more of the light-emitting elements that make up the target pixel. In an example, determining the expected change in light output intensity of the target pixel (step 64) can include separately determining the expected change in light output intensity for each of the light-emitting elements that make up the target pixel. For example, for the pixels 32, described above, with a red LED 34, a green LED 36, and a blue LED 38, step 64 can include one or any combination of: determining the expected change in light output intensity for the red LED 34 of the target pixel 32 based, at least in part, on the specified light output for the target pixel and/or for one or more potential thermal load pixels proximate to the target pixel, as specified in the content information of step 62; determining the expected change in light output intensity for the green LED 36 of the target pixel 32 based, at least in part, on the specified light output for the target pixel and/or for one or more potential thermal load pixels proximate to the target pixel, as specified in the content information of step 62; and determining the expected change in light output intensity for the blue LED 38 of the pixel 32 based, at least in part, on the specified light output for the target pixel and/or one or more potential thermal load pixels proximate to the target pixel, as specified in the content information of step 62.

Once the expected change in light intensity is determined for one or more target pixels in step 64, the method 60 can include, at step 66, modifying light output of each of the one or more target pixels as a function of time to compensate for at least a portion of the expected change in light output intensity for the target pixel. In an example, modifying the light output for each of the target pixels (step 66) can include modifying the light output for one or more of the light-emitting elements that make up the target pixel. In an example, modifying the light output of a target pixel (step 66) can include separately modifying the light output for each of the light-emitting elements that make up the target pixel. For example, in the pixels 32 of the array 30 that each include a red LED 34, a green LED 36, and a blue LED 38, step 66 can include one or any combination of: modifying the light output of the red LED 34 of the target pixel 32 based, at least in part, on the expected change in light output intensity of the red LED 34 of the target pixel 32 that was determined in step 64; modifying the light output of the green LED 36 of the target pixel 32 based, at least in part, on the expected change in light output intensity of the green LED 36 of the target pixel 32 that was determined in step 64; and modifying the light output of the blue LED 38 of the target pixel 32 based, at least in part, on the expected change in light output intensity of the blue LED 38 of the target pixel 32 that was determined in step 64.

Modifying the light output for each of the target pixels (step 66) in the method 60 of FIG. 10 can be similar or identical to step 58 of the method 50 of FIG. 9. For example, as described above with respect to step 58, modifying the light output for each target pixel (step 66) can include determining a light output offset for each of the one or more target pixels for which the expected change in light output intensity was determined in step 64, and then applying the determined light output offset to each of the one or more target pixels whose light output is being modified in step 66. In an example, modifying the light output for each of the one or more target pixels in step 66 can include determining a light output offset for each of the one or more target pixels for which the expected change in light output was determined in step 64 and then applying the determined light output offset to each of the one or more target pixels whose light output is being modified in step 66. For example, as described above with respect to the method 50 of FIG. 9, in an example, applying the light output offset includes modifying the current being supplied to one or more of the light-emitting elements of the target pixel or modifying the power duty cycle of one or more of the light-emitting elements of the target pixel, or both, to offset at least a portion of the expected change in light output intensity determined in step 64.

Modifying the light output of a particular light-emitting element of a target pixel as part of step 66 can include, for example, modifying the current supplied to the particular light-emitting element or modifying the power duty cycle for the particular light-emitting element, or both, to compensate for the expected change in light output intensity for that particular light-emitting element that was determined in step 64. For example, for the pixels 32 of the array 30 shown in FIG. 3, step 66 can include one or any combination of: modifying the supplied current or the power duty cycle, or both, for the red LED 34 of the target pixel 32 to compensate for the expected change in light output intensity of the red LED 34 of the target pixel 32 deter mined in step 64;

modifying the supplied current or the power duty cycle, or both, for the green LED 36 of the target pixel 32 to compensate for the expected change in light output intensity of the green LED 36 of the target pixel 32 determined in step 64; and modifying the supplied current or the power duty cycle, or both, for the blue LED 38 of the target pixel 32 to compensate for the expected change in light output intensity of the blue LED 38 of the target pixel 32 that was determined in step 64.

The steps of each of the methods 50 and 60 can be performed in part via implementation in one or more controllers for an electronic display. As used herein, the term "controller" refers to hardware, software, or a combination of hardware and software that is configured to operate an electronic array of light-emitting elements, such as the array 30 of LEDs 34, 36, 38 shown in FIG. 3, or the array formed by the LEDs 18 in FIGS. 1 and 2. The one or more controllers can be configured to receive or produce content information that includes information regarding the specified light output, as a function of time, for each pixel in the array and/or for each light-emitting element in the array, e.g., specifying one or more characteristics of the light that is to be emitted from each pixel and/or from each light-emitting element in the array for a specified period of operation, which can include, but is not limited to: an intensity of the light to be emitted from each pixel and/or from each light-emitting element; a color to be emitted from each pixel; and the specific period of time within the specified period of operation that the pixel and/or the light-emitting element is to emit light having those specified characteristics.

In an example, the one or more controllers can also be configured to perform the specific determinations described above with respect to method 50 and method 60. For example, the one or more controllers can be configured to: determine the expected temperature for each of the specified one or more target pixels, as a function of time (step 54 of the method 50); determine the expected change in light output intensity for each of the specified one or more target pixels as a function of time (step 56 of the method 50 or step 64 of the method 60); and modify the light output of each of the specified one or more target pixels and/or one or more light-emitting elements as a function of time to compensate for at least a portion of the expected change in light output intensity for each target pixel and/or for one or more light-emitting elements in each target pixel (step 58 of the method 50 or step 66 of the method 60).

In another example, a first controller can be configured to control the pixels and/or the light-emitting elements of the array according to the specified content information (e.g., to control the array according to the content information of step 52 of the method 50 or step 62 of the method 60), while a second controller can be configured to perform one or more of the other steps of the method 50, 60, including one or more of: determining the expected temperature for each of the specified one or more target pixels and/or one or more light-emitting elements of the target pixels, as a function of time (step 54 of the method 50); determining the expected change in light output intensity for each of the specified one or more target pixels and/or for one or more specified light-emitting elements as a function of time (step 56 of the method 50 or step 64 of the method 60); and modifying the light output of each of the specified one or more target pixels and/or light-emitting elements of one or more target pixels as a function of time to compensate for at least a portion of the expected change in light output intensity for each target pixel and/or for each light-emitting element (step 58 of the method 50 or step 66 of the method 60). In other words, in an example, the display can include a primary controller that performs the functions that are conventionally associated with operating an electronic display and a secondary controller that is configured to determine if there is any change in light output intensity based on the specific content being displayed on the array, and if so to modify the output of those light-emitting elements that are expected to be affected by changes in temperature resulting from that specific content. If two or more controllers are used to implement the methods described herein, the two or more controllers can cooperatively implement one or more of the steps of the particular method that is being applied to dynamically compensate for thermally induced changes in light output intensity, or each of the two or more controllers can work relatively independently of the other. The specific hardware or software configuration that is used to implement the methods are not particularly important, so long as they can perform the method steps described above with respect to method 50 and method 60.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof) or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc, are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, embedded flash memory, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising the steps of:

producing or receiving predetermined information regarding specified content to be displayed on an array of pixels, as a function of time, wherein each pixel comprises one or more light-emitting elements, and wherein the predetermined information includes a specified light output for the specified content for each of the one or more light-emitting elements of each pixel in the array, as a function of time;

determining a predetermined expected change in light intensity capability that the one or more light-emitting elements of each of one or more of the pixels is able to produce, as a function of time, wherein the predetermined expected change in light intensity capability that the one or more light-emitting elements of each particular pixel is able to produce, as a function of time, is dependent, at least in part, on a predetermined expected temperature at that particular pixel, as a function of time, due to a predetermined expected heat to be generated by the one or more light-emitting elements of that particular pixel when the specified light output to produce the specified content is emitted by the one or more light-emitting elements of that particular pixel, as a function of time; and modifying a light intensity output of the one or more light-emitting elements of each particular pixel, as a function of time, to compensate for at least a portion of the predetermined expected change in the light intensity capability that the one or more light-emitting elements of that particular pixel is able to produce, as a function of time.

2. The method of claim 1, wherein determining the predetermined expected change in light intensity capability that each particular pixel is able to produce, as a function of time, includes determining the predetermined expected temperature at each of the one or more of the pixels, as a function of time.

3. The method of claim 2, wherein each pixel of the array comprises a plurality of light-emitting elements, wherein determining the predetermined expected temperature of each particular pixel, as a function of time, comprises determining a predetermined expected temperature at one or more of the light-emitting elements of the first of that particular pixel, as a function of time.

4. The method of claim 1, wherein the predetermined expected temperature for each particular pixel, as a function of time, is dependent, at least in part, on at least one of:

a predetermined expected heat to be generated by the one or more light-emitting elements of one or more second pixels that are within a specified distance from that particular pixel when the specified light output to produce the specified content is emitted by the one or more light-emitting elements of the one or more second pixels, as a function of time;

predetermined expected heat to be generated by a heat generating component of the array that is proximate to the first of that particular pixel, as a function of time;

predetermined expected heat to be dissipated from that particular pixel, as a function of time.

5. The method of claim 1, wherein each pixel of the array comprises a plurality of light-emitting elements, wherein determining the predetermined expected change in light intensity capability that the one or more light-emitting elements of that particular pixel are able to produce, as a function of time, comprises determining a predetermined expected change in light intensity capability that each of the plurality of light-emitting elements of that particular pixel is able to produce, as a function of time, based, at least in part, on the predetermined expected temperature at that particular pixel due to a predetermined expected heat to be generated by each of the plurality of light-emitting elements of that particular pixel when the specified light output to produce the specified content is emitted by the plurality of light-emitting elements of that particular pixel, as a function of time.

6. The method of claim 5, wherein modifying the light intensity output of the one or more light-emitting elements of that particular pixel, as a function of time, comprises modifying a light intensity output of each of the plurality of light-emitting elements of that particular pixel, as a function of time, to compensate for at least a portion of the predetermined expected change in the light intensity capability that each of the plurality of light-emitting elements of that particular pixel is able to produce, as a function of time.

7. The method of claim 6, wherein modifying the light intensity output of each of the plurality of light-emitting elements of that particular pixel, as a function of time, comprises one or both of:

modifying a current being supplied to each of the plurality of light-emitting elements of that particular pixel, as a function of time, to modify the light intensity output of each of the plurality of light-emitting elements of the first of that particular pixel, as a function of time; and modifying a power duty cycle for each of the plurality of light-emitting elements of that particular pixel, as a function of time, to modify the light intensity output of each of the plurality of light-emitting elements of that particular pixel, as a function of time.

8. The method of claim 1, wherein modifying the light intensity output of the one or more light-emitting elements of that particular pixel, as a function of time, comprises one or both of:

modifying a current being supplied to the one or more light-emitting elements of that particular pixel, as a function of time, to modify the light intensity output of the one or more light-emitting elements of that particular pixel, as a function of time; and modifying a power duty cycle for the one or more light-emitting elements of that particular pixel, as a function of time, to modify the light intensity output of the one or more light-emitting elements of that particular pixel, as a function of time.

9. An electronic display comprising:

an array of pixels, wherein each pixel comprises one or more light-emitting elements; and one or more controllers configured to control light output of the light-emitting elements in the array of pixels and further configured to:

receive predetermined information regarding specified content to be displayed on the array of pixels, as a function of time, wherein the predetermined information includes a specified light output for the specified content for each of the one or more light-emitting elements of each pixel in the array, as a function of time;

determine a predetermined expected change in light intensity capability that the one or more light-emitting elements of each of one or more of the pixels is able to produce, as a function of time, wherein the predetermined expected change in light intensity capability that the one or more light-emitting elements of each particular pixel of the one or more of the pixels is able to produce, as a function of time, is dependent, at least in part, on a predetermined expected temperature at that particular pixel, as a function of time, due to a predetermined expected heat to be generated by the one or more light-emitting elements of that particular pixel when the specified light output to produce the specified content is emitted by the one or more light-emitting elements of that particular pixel, as a function of time; and modify light intensity output of the one or more light-emitting elements of each particular pixel, as a function of time, to compensate for at least a portion of the predetermined expected change in the light intensity capability that the one or more light-emitting elements of that particular pixel is able to produce, as a function of time.

10. The electronic display of claim 9, wherein the one or more controllers are further configured to determine the predetermined expected temperature at each of the one or more of the pixels, as a function of time.

11. The electronic display of claim 10, wherein each pixel of the array comprises a plurality of the light-emitting elements, wherein the one or more controllers are further configured to determine a predetermined expected temperature at each of the plurality of light-emitting elements of the first of that particular pixel, as a function of time.

12. The electronic display of claim 9, wherein the predetermined expected temperature of each particular pixel, as a function of time, is dependent, at least in part, on at least one of:

a predetermined expected heat to be generated by the one or more light-emitting elements of one or more second pixels that are within a specified distance from that particular pixel when the specified light output to produce the specified content is emitted by the one or more light-emitting elements of the one or more second pixels, as a function of time;

predetermined expected heat to be generated by a heat generating component of the display that is proximate that particular pixel, as a function of time; and predetermined heat to be dissipated from that particular pixel, as a function of time.

13. The electronic display of claim 9, wherein each pixel of the array comprises a plurality of the light-emitting elements, wherein the one or more controllers are further configured to determine a predetermined expected change in light intensity capability that each of the plurality of light-emitting elements of that particular pixel is able to produce, as a function of time, based, at least in part, on the predetermined expected temperature at that particular pixel due to a predetermined expected heat to be generated by each of the plurality of light-emitting elements of that particular pixel when the specified light output to produce the specified content is emitted by the plurality of light-emitting elements of that particular pixel, as a function of time.

14. The electronic display of claim 13, wherein the one or more controllers are further configured to modify a light intensity output of each of the plurality of light-emitting elements of that particular pixel, as a function of time, to compensate for at least a portion of the predetermined expected change in the light intensity capability that each of the plurality of the light-emitting elements of that particular pixel is able to produce, as a function of time.

15. The electronic display of claim 14, wherein the one or more controllers are further configured to modify one or both of:

a current being supplied to each of the plurality of light-emitting elements of that particular pixel, as a function of time, to modify the light intensity output of each of the plurality of light-emitting elements of that particular pixel, as a function of time; and a power duty cycle for each of the plurality of light-emitting elements of each particular pixel, as a function of time, to modify the light intensity output of one or more of the plurality of light-emitting elements of that particular pixel, as a function of time.

16. The electronic display of claim 9, wherein the one or more controllers are further configured to modify one or both of:

a current being supplied to the one or more light-emitting elements of that particular pixel, as a function of time, to modify the light intensity output of the one or more light-emitting elements of that particular pixel, as a function of time; and a power duty cycle for the one or more light-emitting elements of that particular pixel, as a function of time, to modify the light intensity output of the one or more light-emitting elements of that particular pixel, as a function of time.

* * * * *